US010440272B2

United States Patent
Noto

(10) Patent No.: US 10,440,272 B2
(45) Date of Patent: Oct. 8, 2019

(54) IMAGING APPARATUS FOR CONTROLLING ACTUATOR WHICH INCLUDES VIBRATOR HAVING CONTACT PORTION AND RELATIVE MOVEMENT MEMBER WITH WHICH THE CONTACT PORTION OF THE VIBRATOR IS PRESSURIZED AND IN CONTACT, CONTROL METHOD FOR THE IMAGING APPARATUS, PROGRAM OF THE IMAGING APPARATUS, AND STORAGE MEDIUM WHICH STORES THE PROGRAM OF THE IMAGING APPARATUS

(71) Applicant: CANON KABUSHIKI KAISHA, Tokyo (JP)

(72) Inventor: Goro Noto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 15/158,862

(22) Filed: May 19, 2016

(65) Prior Publication Data

US 2016/0353028 A1 Dec. 1, 2016

(30) Foreign Application Priority Data

May 25, 2015 (JP) ................................. 2015-105533

(51) Int. Cl.
*H04N 5/232* (2006.01)
*G03B 3/00* (2006.01)

(52) U.S. Cl.
CPC ........... *H04N 5/23287* (2013.01); *G03B 3/00* (2013.01); *H04N 5/232* (2013.01);
(Continued)

(58) Field of Classification Search
CPC ............. H04N 5/23296; H04N 5/2254; H04N 2005/2255; H04N 5/23212;
(Continued)

(56) References Cited

U.S. PATENT DOCUMENTS 6,822,688 B2 * 11/2004 Ohta .................. H04N 5/23212
348/335
2001/0015830 A1 * 8/2001 Matsuda ................ H04N 1/195
358/474
(Continued)

FOREIGN PATENT DOCUMENTS

JP 2005-189534 A 7/2005
JP 2012-023884 A 2/2012
(Continued)

OTHER PUBLICATIONS

The above foreign patent documents were cited in the Mar. 5, 2019 Japanese Office Action, a copy of which is enclosed without an English Translation, that issued in Japanese Patent Application No. 2015105533.

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

To provide an imaging apparatus capable of maintaining good performance even if it is used in a high-humidity environment, the imaging apparatus is equipped with a detecting unit for detecting an environment of a photographing optical system, and a control unit for controlling an actuator of driving the photographing optical system to perform a first operation and a second operation of performing maintenance of the photographing optical system, and driving the actuator in the second operation at a timing according to the environment.

7 Claims, 14 Drawing Sheets

(52) U.S. Cl.
CPC ..... *H04N 5/23212* (2013.01); *H04N 5/23241* (2013.01); *G03B 2205/0061* (2013.01)

(58) Field of Classification Search
CPC ............. H04N 5/23287; H04N 9/3144; H04N 5/23241; H04N 5/232
See application file for complete search history.

(56) References Cited

U.S. PATENT DOCUMENTS

| | | | |
|---|---|---|---|
| 2002/0080260 A1* | 6/2002 | Ojima | H04N 5/232 348/348 |
| 2002/0089257 A1* | 7/2002 | Kato | H02N 2/142 310/316.02 |
| 2005/0063694 A1* | 3/2005 | Nakazawa | G02B 7/028 396/97 |
| 2009/0167878 A1* | 7/2009 | Kawazoe | G02B 7/08 348/208.5 |
| 2011/0164331 A1* | 7/2011 | Sugiyama | H02N 2/062 359/823 |
| 2012/0169917 A1* | 7/2012 | Isobe | G02B 7/08 348/345 |
| 2014/0307113 A1* | 10/2014 | Ohashi | H02N 2/0055 348/208.11 |
| 2016/0226402 A1* | 8/2016 | Morita | H02N 2/0075 |
| 2016/0255277 A1* | 9/2016 | Noto | H04N 5/23287 348/208.11 |
| 2017/0054884 A1* | 2/2017 | Leu | H04N 5/2254 |

FOREIGN PATENT DOCUMENTS

| | | |
|---|---|---|
| JP | 2012-037777 A | 2/2012 |
| JP | 5110824 B | 12/2012 |

* cited by examiner

FIG. 4A
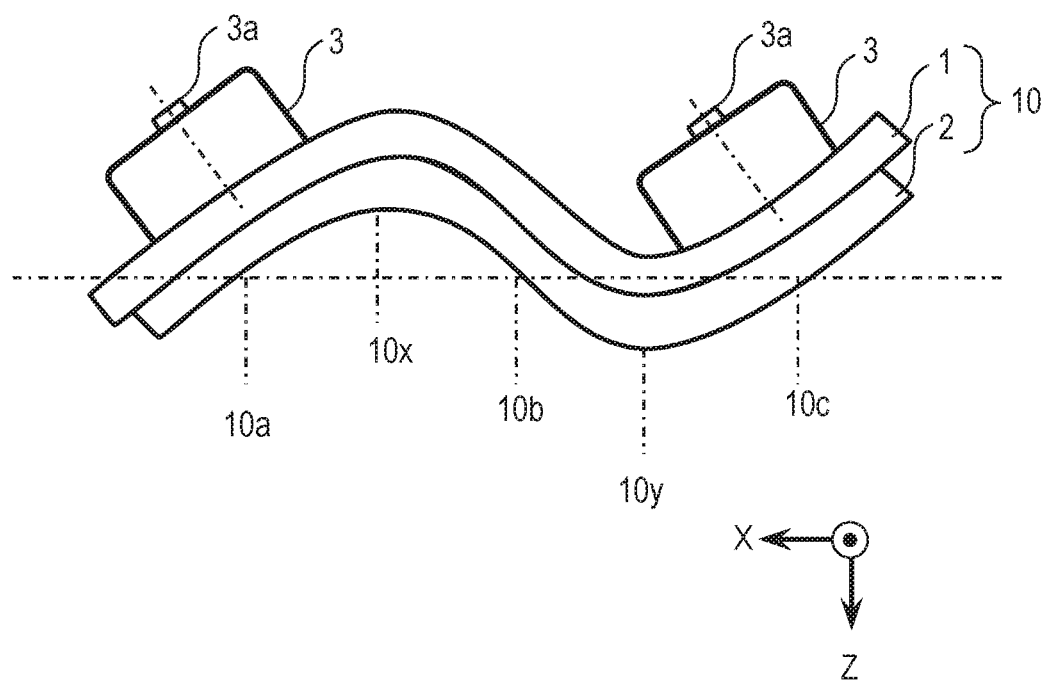
FIG. 4B
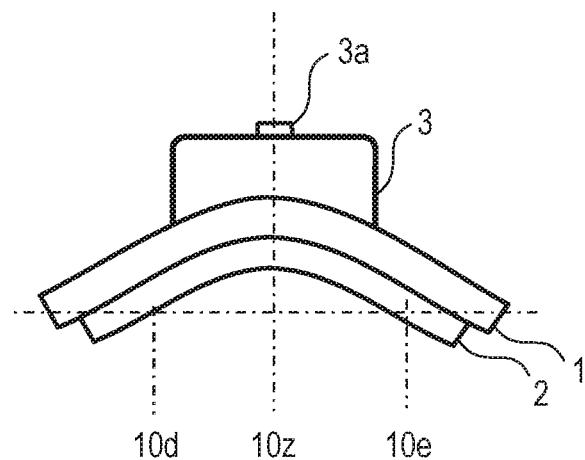
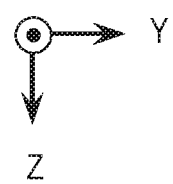

IMAGING APPARATUS FOR CONTROLLING ACTUATOR WHICH INCLUDES VIBRATOR HAVING CONTACT PORTION AND RELATIVE MOVEMENT MEMBER WITH WHICH THE CONTACT PORTION OF THE VIBRATOR IS PRESSURIZED AND IN CONTACT, CONTROL METHOD FOR THE IMAGING APPARATUS, PROGRAM OF THE IMAGING APPARATUS, AND STORAGE MEDIUM WHICH STORES THE PROGRAM OF THE IMAGING APPARATUS

BACKGROUND OF THE INVENTION

Field of the Invention

The present invention relates to an imaging apparatus, a control method of the imaging apparatus, a program for performing the control method, and a storage medium of storing the program.

Description of the Related Art

There has been proposed an imaging apparatus which is equipped with, as the driving source of a camera mechanical part and a lens, an actuator which causes elliptic motion at a predetermined position of a vibrator such that the vibrator and a friction member frictionally in contact with the vibrator relatively move.

In the vibrator which constitutes the actuator, for example, a piezoelectric element serving as an electro-mechanical energy converting element is bonded to an elastic body such as metal or the like, and two-phase AC (alternate current) voltages having mutually different phases can be applied to the piezoelectric element. Thus, vibration waves are excited on the surface of the vibrator by applying the voltages to the piezoelectric element, and the vibrator is relatively moved by pressurizing it against the friction member, so that the vibrator slides on the surface of the friction member with desired driving force.

When the vibrator is being pressurized and in contact with the surface of the friction member, friction force generates. Thus, the actuator remains and is held at its initial position even after the voltage application is terminated. Accordingly, the friction force like this is also called holding force.

However, when the vibrator is held at the same position on the surface of the friction member for a long time, a small amount of water (or moisture) in the air coheres at the contact portion between the vibrator and the friction member, so that the friction force, i.e., the holding force, decreases. Then, when the vibrator is pressurized (or pressed) by external force in the state that the holding force has decreased, there is a case where the actuator inevitably moves. When the actuator for driving the lens moves, an out of focus occurs.

In this context, the driving apparatus for recovering decreased holding force has been proposed (Japanese Patent No. 5110824). When a vibrational wave motor stops for a predetermined time, this driving apparatus drives the vibrator to evaporate water or moisture by frictional heat generated between the vibrator and the rotation member, thereby recovering the torque of the motor.

Incidentally, when the imaging apparatus is used in a high-humidity environment, or when dew condensation (or dewfall) occurs due to movement of the imaging apparatus from a low-temperature environment to a high-temperature environment, water easily coheres at the contact portion as compared with a case where the imaging apparatus is used in a normal-temperature environment. For this reason, the out of focus occurs more easily in the imaging apparatus when it is used in the high-humidity environment.

An object of the present invention is to provide an imaging apparatus capable of maintaining good performance even if it is used in the high-humidity environment.

SUMMARY OF THE INVENTION

To achieve the above object, the present invention is directed to an imaging apparatus which is characterized by comprising: a detecting unit configured to detect an environment of a photographing optical system; and a control unit configured to control an actuator of driving the photographing optical system to perform a first operation and a second operation of performing maintenance of the photographing optical system, and drive the actuator in the second operation at a timing according to the environment.

According to the present invention, a timing of the driving of the actuator for performing the maintenance of the photographing optical system is changed according to environmental information. Thus, the holding force is less likely to decrease even if the imaging apparatus is used in a high-humidity environment, so that it is possible to maintain good performance.

Further features of the present invention will become apparent from the following description of exemplary embodiments with reference to the attached drawings.

BRIEF DESCRIPTION OF THE DRAWINGS

FIGS. 4A and 4B are schematic diagrams for illustrating operations of a vibrator.

DESCRIPTION OF THE EMBODIMENTS

First Embodiment

Figure 1:
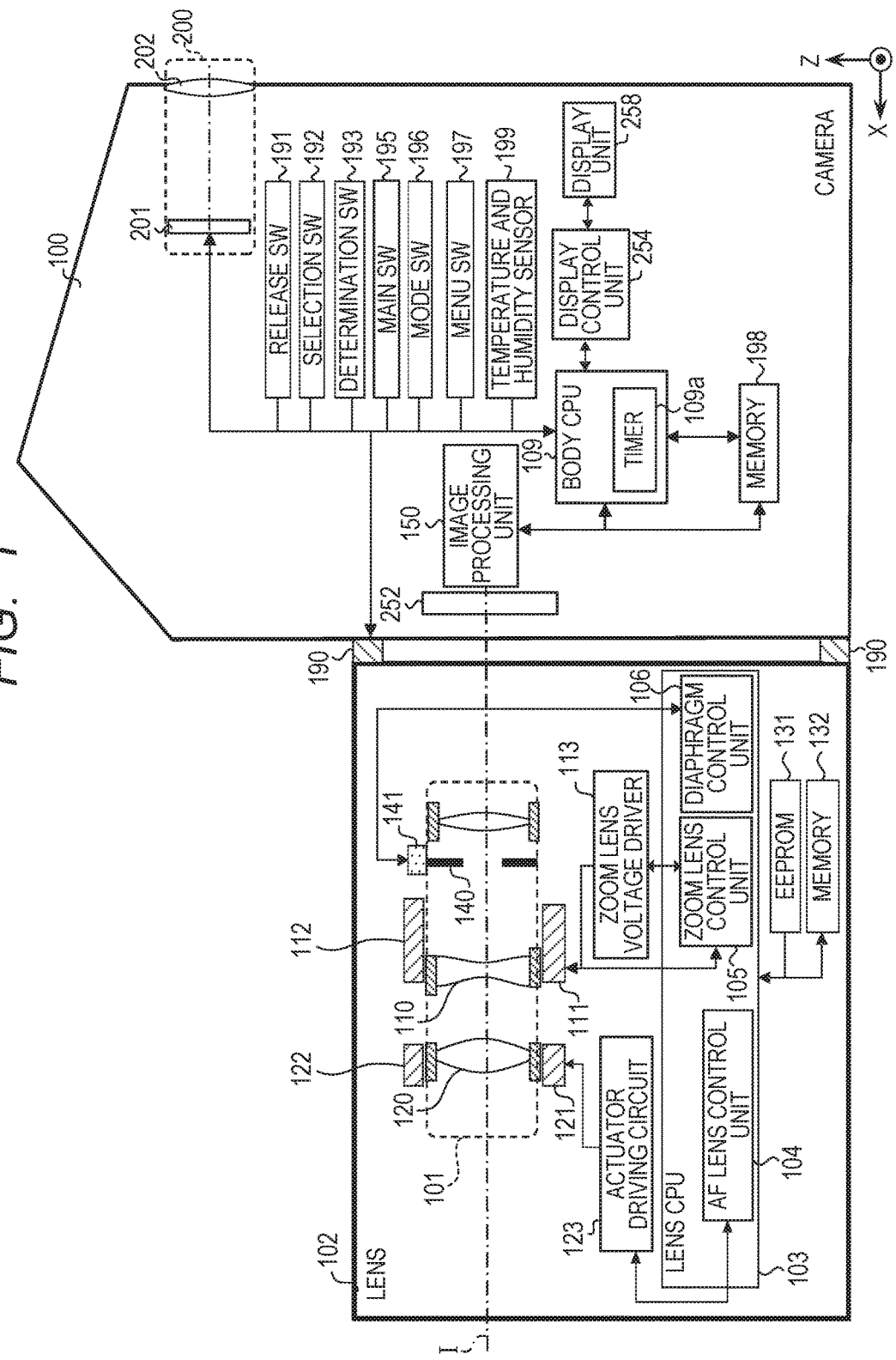
FIG. 1 is a block diagram for illustrating an imaging apparatus according to the first embodiment of the present invention.
Figure 2:
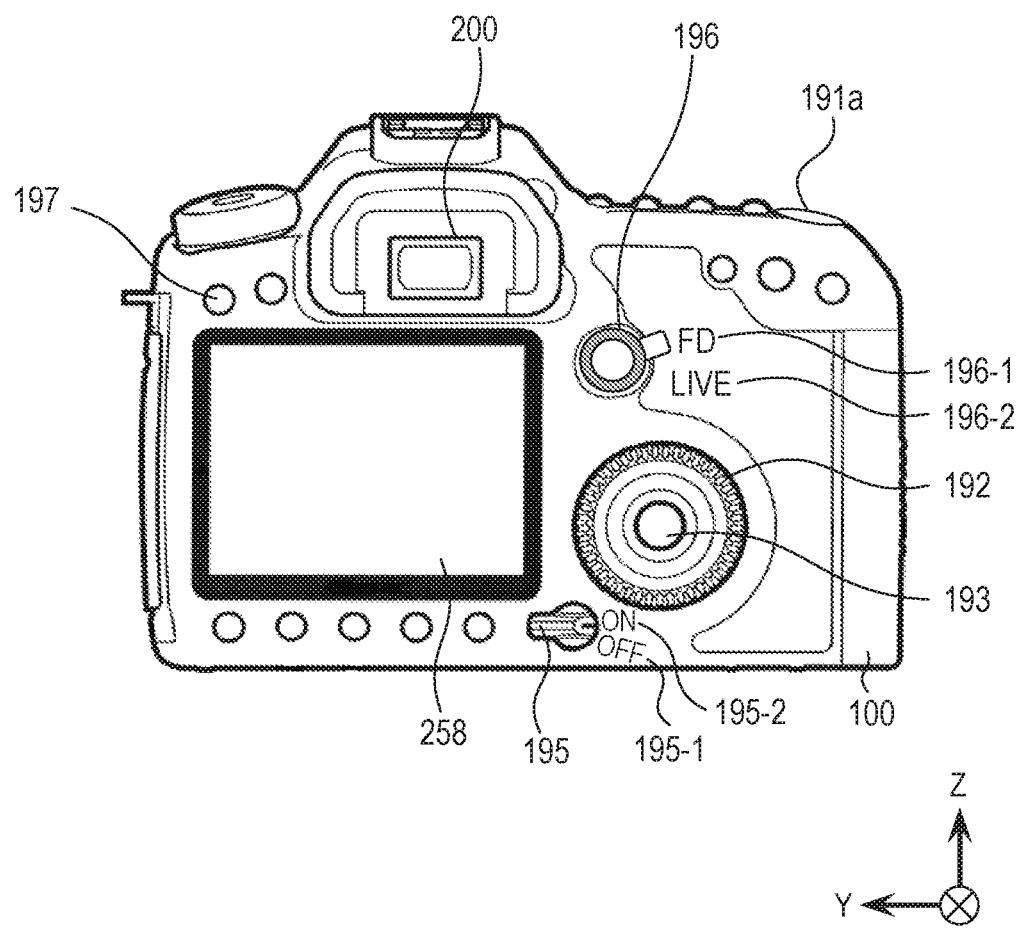
FIG. 2 is a back view for illustrating the imaging apparatus according to the first embodiment.

The first embodiment of the present invention will be described with reference to FIGS. 1 to 10. FIG. 1 is the block diagram for illustrating an imaging apparatus according to the present embodiment, and FIG. 2 is the back view for illustrating the imaging apparatus according to the present embodiment.

The imaging apparatus (imaging system) according to the present embodiment is constituted by a camera (imaging apparatus main body) 100 and a lens (lens device) 102. The camera 100 is, e.g., a digital camera. The lens 102 is constituted so as to be detachably mounted to the camera 100.

The imaging apparatus according to the present embodiment comprises an imaging system, an image processing system, a recording/reproducing system and a controlling system. The imaging system includes, for example, a photographing optical system 101 provided in the lens 102, and an imaging element 252 provided in the camera 100. The image processing system includes, for example, an image processing unit 150 provided in the camera 100. The recording/reproducing system includes, for example, a memory 198 provided in the camera 100, and a display unit 258 provided in the camera 100. The controlling system includes, for example, a body CPU (central processing unit) 109 provided in the camera 100, a lens CPU 103 provided in the lens 102, an actuator 121 for driving an AF lens 120, and an actuator driving circuit 123 for driving the actuator 121. The controlling system further includes a zoom lens driving unit 111 for driving a zoom lens 110, and a zoom lens voltage driver 113 for driving the zoom lens driving unit 111.

The imaging system forms an image based on light from a not-illustrated substance (object) on the imaging surface of the imaging element 252 via the photographing optical system 101. The zoom lens 110 can be driven in the direction of an optical axis I by the zoom lens driving unit 111 driven by an ultrasonic motor (not illustrated), a stepping motor (not illustrated) or the like. The voltage to be used to control the zoom lens driving unit 111 is input to the zoom lens diving unit 111 from the zoom lens voltage driver 113.

The position of the zoom lens 110 in the direction of the optical axis I is detected by a zoom position detecting unit 112. The zoom position detecting unit 112 serves as an encoder for detecting the position of the zoom lens 110 in the direction of the optical axis I. The zoom position detecting unit 112 outputs a pulse signal to a zoom lens control unit 105. The zoom lens control unit 105 can detect the position of the zoom lens 110, based on the pulse signal output from the zoom position detecting unit 112.

The zoom lens control unit 105 controls the zoom lens driving unit 111 such that the zoom lens 110 is moved to the position, on the optical axis I, corresponding to the focal distance set by a user with, e.g., a not-illustrated switch. For example, the switch by which the user sets the focal distance is provided on the camera 100 or the lens 102.

The zoom lens control unit 105 calculates a driving signal for driving the zoom lens 110, based on the position (target position) on the optical axis I corresponding to the focal distance set by the user and the information of the current position of the zoom lens 110. The digital-value driving signal obtained by the calculation is input from the zoom lens control unit 105 to the zoom lens voltage driver 113. The zoom lens voltage driver 113 controls the zoom lens driving unit 111 based on the driving signal input from the zoom lens control unit 105. Thus, the zoom lens 110 can be located at the position, on the optical axis I, corresponding to the focal distance set by the user.

Moreover, the photographing optical system 101 comprises the AF lens 120. The AF lens 120 can be driven in the direction of the optical axis I by using the actuator 121 as the driving source. Here, for example, an ultrasonic vibrator unit is used as the actuator 121. The voltage for driving the actuator 121 is input from the actuator driving circuit 123 to the actuator 121.

The position of the AF lens 120 in the direction of the optical axis I is detected by a focus position detecting unit 122. The focus position detecting unit 122 is the encoder for detecting the position of the AF lens 120 in the direction of the optical axis I. The focus position detecting unit 122 outputs a pulse signal to an AF lens control unit 104. The AF lens control unit 104 can detect the position of the AF lens 120, based on the pulse signal output from the focus position detecting unit 122.

The AF lens control unit 104 controls the AF lens 120 such that the AF lens 120 is located at the position on the optical axis I corresponding to the object distance. Incidentally, the object position is detected by, for example, the user's operation of a release SW (switch) 191 of the camera 100.

The AF lens control unit 104 calculates the driving signal for driving the AF lens 120, based on the information of the position (target position) on the optical axis I corresponding to the object distance and the information of the current position of the AF lens 120. The digital-value driving signal obtained by the calculation is input from the AF lens control unit 104 to the actuator driving circuit 123. The actuator driving circuit 123 drives the actuator 121 based on the driving signal output from the AF lens control unit 104. Namely, the actuator driving circuit 123 drives the actuator 121, by controlling the frequencies and the phases of AC voltages V1 and V2 respectively applied to electrodes A1 and A2 provided on a later-described piezoelectric element 2, based on the driving signal output from the AF lens control unit 104. Thus, it is possible to locate the AF lens 120 at the position corresponding to the object distance, on the optical axis I.

The photographing optical system 101 comprises a diaphragm 140. The aperture size of the diaphragm 140 is adjusted by a diaphragm driving unit 141 which uses a stepping motor or the like as the driving source. A signal for controlling the diaphragm driving unit 141 is input from a diaphragm control unit 106 to the diaphragm driving unit 141. The diaphragm control unit 106 calculates the value of the diaphragm for obtaining an optimal exposure amount according to, for example, brightness of the object to be photographed, and outputs the driving signal obtained by the calculation to the diaphragm driving unit 141.

The zoom lens control unit 105, the AF lens control unit 104 and the diaphragm control unit 106 are provided in the lens CPU 103. The lens CPU 103 is the central processing unit which performs various kinds of control at the side of the lens 102. The lens CPU 103 can communicate with the body CPU 109 via lens contact points 190 provided between the lens 102 and the camera 100.

An EEPROM (electrically erasable programmable read-only memory) 131 is connected to the lens CPU 103. The EEPROM 131 is the non-volatile storage unit which stores therein lens data and the like as various kinds of inherent information related to the lens 102. Further, a memory 132 is connected to the lens CPU 103.

The body CPU 109 is provided in the camera 100. The body CPU 109 is the central processing unit which performs various kinds of control for the camera 100, and also performs various kinds of control for the whole of the imaging apparatus.

Information is input to the body CPU 109 from the release SW 191, so that the body CPU can detect whether the release SW 191 is half depressed or completely depressed. Thus, the body CPU 109 performs driving control for the imaging element 252, operation control for the image processing unit 150, a compression process for the memory 198, and the like. Moreover, the body CPU 109 controls a display control unit 254 to control the state of each segment to be displayed on the display unit 258. The body CPU 109 also controls the state of each segment to be displayed on a display unit 201 provided in a finder 200. Moreover, the body CPU 109 comprises a timer 109a serving as a measuring unit. As described later, the timer is constituted to start counting or measuring of an elapsed time simultaneously with completion of the driving of the actuator 121.

The image processing unit 150, which comprises therein an A/D (analog-to-digital) converter, a white balance circuit, a gamma correction circuit, an interpolation calculation circuit and the like, can generate images to be recorded.

The imaging element 252 is, for example, the CMOS (complementary metal-oxide semiconductor) image sensor (hereinafter, called the CMOS sensor) which is the solid-state imaging element using a CMOS. It is possible, on the CMOS sensor, to form the MOS (metal-oxide semiconductor) transistor of the area sensor unit, and the peripheral circuits such as the imaging apparatus driving circuit, the A/D converting circuit, the image processing circuit and the like, in the same manufacturing step, whereby it is possible to remarkably reduce the number of masks and the number of process steps, as compared with a CCD (charge-coupled device). Moreover, as for the CMOS sensor, it is possible to perform random access to an arbitrary pixel, it is possible to easily perform thinned reading for display, and it is possible to perform real-time display on the display unit 258 at a high display rate.

Thus, by using such features as described above, the imaging element 252 can perform a display image outputting operation of reading the light receiving area of the imaging element 252 while thinning a part thereof, and a high-definition image outputting operation of reading the whole light receiving area of the imaging element 252.

In the imaging element 252, as described in, e.g., Japanese Patent Application Laid-Open No. 2012-037777, the pixels to be used for focus detection are arranged in the light receiving area. Thus, the body CPU 109 obtains the defocus amount of the photographing image based on the object image formed on the imaging element 252. Then, the body CPU 109 controls the driving of the AF lens 120 by transmitting the signal according to the obtained defocus amount to the CPU 103 via the lens contact point 190.

The signal is input from the release SW 191 to the body CPU 109. The release SW 191 is the switch to be used to start a series of photographing preparation operations, i.e., a photometric operation, a focus adjusting operation and the like, in response to the half depression operation of a release button 191a (i.e., ON of not-illustrated SW 1). The release SW 191 is also the switch to be used to start a photographing operation, i.e., an operation of recording the image data read from the imaging element 252 to a recording medium, in response to the complete depression operation of the release button 191a (i.e., ON of not-illustrated SW 2). When the SW 1 provided on the release SW 191 is ON, the half depression of the release button 191a can be detected. When the SW 2 provided on the release SW 191 is ON, the complete depression of the release button 191a can be detected.

The signal is input from a selection SW 192 to the body CPU 109. The selection SW 192 is the switch to be used to select the setting items and the photographing conditions displayed when a later-described menu SW 197 is operated.

The signal is input from a determination SW 193 to the body CPU 109. The determination SW 193 is the switch to be used to determine the setting item menu and the setting values thereof displayed when the later-described menu SW 197 is operated.

The signal is input from a main SW 195 to the body CPU 109. The main SW 195 is the switch to be used to start the operation of the camera 100. As illustrated in FIG. 2, the main SW 195 is the two-position switch which can select either one of two positions 195-1 and 195-2. The position 195-1 of the main SW 195 corresponds to "OFF". When the main SW 195 is set to the position 195-1, the camera 100 comes into a sleep state. On the other hand, the position 195-2 of the main SW 195 corresponds to "ON". When the main SW 195 is set to the position 195-2, the camera 100 comes into a driving state. In the driving state, it is possible to accept the operations of the various switches and perform the operations for photographing still images and moving images.

The signal is input from a mode SW 196 to the body CPU 109. The mode SW 196 is the switch to be used to set the mode, i.e., an observation mode, when a user observes an object. As illustrated in FIG. 2, the mode SW 196 is the two-position switch which can select either one of two positions 196-1 and 196-2. For example, there are following first and second observation modes. The first observation mode is the finder mode in which the user observes the object image displayed on the display unit 201 provided in the finder 200, via an eyepiece 202. The second observation mode is the live view mode in which the user observes the object image displayed on the display unit 258 provided independently of the finder 200.

The position 196-1 of the mode SW 196 corresponds to the finder mode, and the symbol "FD" indicating the finder mode is given to this position. When the mode SW 196 is set to the position 196-1, the user can observe the object image by using the finder 200.

On the other hand, the position 196-2 of the mode SW 196 corresponds to the live view mode, and the symbol "LIVE" indicating the live view mode is given to this position. When the mode SW 196 is set to the position 196-2, the user can observe the object image displayed on the display unit 258.

The signal is input from the menu SW 197 to the body CPU 109. The menu SW 197 is the switch to be used to display the menu for setting the photographing conditions and various operations of the camera 100. When the menu SW 197 is operated in the state that the menu is not displayed on the display unit 258, the menu is displayed on the display unit 258. On the other hand, when the menu SW 197 is operated in the state that the menu is being displayed on the display unit 258, the camera comes into the state that the menu is not displayed on the display unit 258.

The memory 198 provided in the camera 100 is connected to the image processing unit 150 and the body CPU 109. The memory 198 records thereon the object image and the like generated by the image processing unit 150. The memory 198 stores therein the setting values necessary for the body CPU 109 to control the operation of the camera 100.

Moreover, the memory 198 stores therein the various programs to be executed by the body CPU 109. Moreover, the memory 198 performs compressions of images, moving images, voices and the like, by a predetermined method.

A temperature and humidity sensor 199 provided in the camera 100 is connected to the body CPU 109. The temperature and humidity sensor 199 detects the temperature and the humidity in the camera 100. For example, the temperature and humidity sensor 199 measures the temperature by measuring the resistance value of a metal resistor (not illustrated). For example, the temperature and humidity sensor 199 measures the humidity by measuring the capacitance of a capacitor (not illustrated) provided in the temperature and humidity sensor 199. Incidentally, the methods of detecting the temperature and the humidity are not limited to those described above.

The finder 200 comprises the display unit 201 and the eyepiece 202 provided in the finder 200. In the finder 200, the object image formed on the imaging element 252 is transferred to the display unit 201 via the body CPU 109, so that the transferred object image is displayed on the display unit 201. The user can observe the object image enlarged by means of the eyepiece 202.

Incidentally, the finder 200 may be an optical finder, i.e., a single-lens reflex optical finder, by which the user can observe the object image by using a mirror (not illustrated) provided between the photographing optical system 101 and the imaging element 252.

The display control unit 254 provided in the camera 100 is connected to the body CPU 109 and the display unit 258. The display unit 258 is provided on the back of the camera 100. The user can directly observe the display screen of the display unit 258. The body CPU 109 is used to display the object image formed on the imaging element 252, on the display unit 258 via the display control unit 254. When the menu SW 197 is operated, the body CPU 109 causes the display unit 258 to display the menu via the display control unit 254. If the display unit 258 is constituted by an organic EL (electroluminescence) spatial modulation element, a liquid spatial modulation element, a spatial modulation element using electrophoresis of minute particles, etc., the power consumption of the display unit 258 can be reduced, and the display unit 258 itself can be made thinner. Thus, it is possible to achieve power saving and downsizing of the camera 100.

Figure 3A:
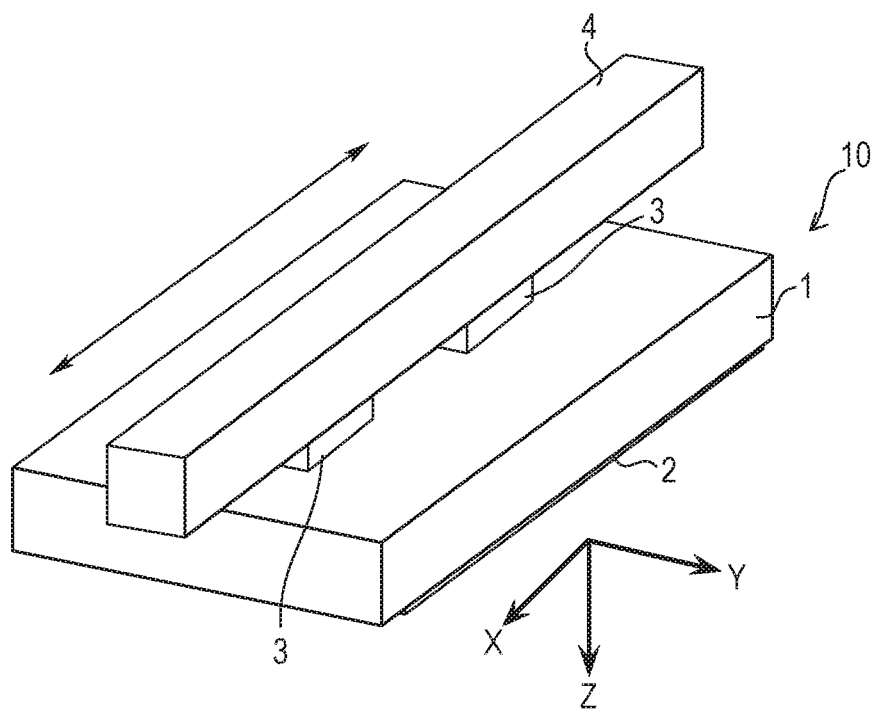
FIGS. 3A and 3B are perspective and plan diagrams for illustrating an actuator.
Figure 3B:
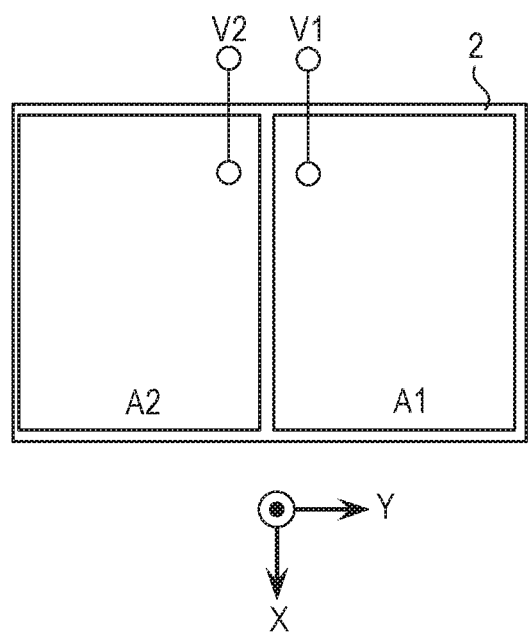

Subsequently, the actuator 121 which is used in the imaging apparatus according to the present embodiment will be described with reference to FIGS. 3A to 6. FIGS. 3A and 3B are the perspective and plan diagrams for illustrating the constitution of the actuator. FIG. 3A is the perspective diagram, and FIG. 3B is the plan diagram. Incidentally, it is assumed that the direction in which a vibrator 10 moves, i.e., the direction of the optical axis I, is the X direction, the direction in which the vibrator 10 is pressurized against a slider 4 is the Z direction, and the direction which is perpendicular to the X direction and the Z direction is the Y direction.

As illustrated in FIG. 3A, for example, the vibrator 10 comprises an elastic body 1 formed by metal, and the piezoelectric element 2 bonded to the back of the elastic body 1 by an adhesive or the like. A plurality of convex portions 3 are provided on one of the main surfaces of the elastic body 1. As illustrated in FIGS. 4A and 4B, a contact portion 3a for contacting the slider 4 is provided on each of the convex portions 3.

As illustrated in FIG. 3B, the piezoelectric element 2 has been polarized. The two electrodes A1 and A2 are provided on one of the main surfaces of the piezoelectric element. When the later-described AC voltages V1 and V2 are applied respectively to the electrodes A1 and A2, the piezoelectric element 2 vibrates in the mode according to the applications of the AC voltages V1 and V2, so that the vibrator 10 vibrates.

Hereinafter, the vibration mode of the vibrator 10 will be described with reference to FIGS. 4A and 4B. FIGS. 4A and 4B are the schematic diagrams for illustrating the operations of the vibrator 10.

FIG. 4A is the diagram for illustrating the vibration in the X-direction bending secondary vibration mode. When the reverse-phase AC voltages V1 and V2 are applied to the two electrodes A1 and A2 provided on the piezoelectric element 2 of the vibrator 10, the vibration in the X-direction bending secondary vibration mode is excited in the vibrator 10 as illustrated in FIG. 4A. Here, symbols 10a, 10b and 10c correspond to the positions of the nodes in the X-direction bending secondary vibration mode, and symbols 10x and 10y correspond to the positions of the antinodes in the X-direction bending secondary vibration mode. In the X-direction bending secondary vibration mode, although each of the positions 10a, 10b and 10c of the nodes is not largely displaced in the Z direction, the normal line direction of the surface of the vibrator 10 at each of the positions 10a, 10b and 10c of the nodes is largely changed. Therefore, the contact portion 3a at the top of the convex portion 3 positioned at each of the positions 10a and 10c of the nodes does not vibrate with a large amplitude in the Z direction but vibrates with a large amplitude in the X-direction, in the X-direction bending secondary vibration mode. Thus, in the present embodiment, since the convex portions 3 are arranged at the positions 10a and 10c of the nodes in the X-direction bending secondary vibration mode, the large vibration in the X direction generates at the contact portion 3a. The mode like this is called a feeding mode.

FIG. 4B is the diagram for illustrating the vibration in the Y-direction bending primary vibration mode. When the same-phase AC voltages V1 and V2 are applied to the two electrodes A1 and A2 provided on the piezoelectric element 2 of the vibrator 10, the vibration in the Y-direction bending primary vibration mode is excited in the vibrator 10 as illustrated in FIG. 4B. Here, symbols 10d and 10e correspond to the positions of the nodes in the Y-direction bending primary vibration mode, and a symbol 10z corresponds to the position of the antinode in the Y-direction bending primary vibration mode. In the Y-direction bending primary vibration mode, although each of the positions 10d and 10e of the nodes is not largely displaced in the Z direction, the position 10z of the antinode is largely displaced in the Z direction. Therefore, in the Y-direction bending primary vibration mode, the contact portion 3a at the top of the convex portion 3 positioned at the position 10z of the antinode vibrates with a large amplitude in the Z direction. Thus, in the present embodiment, since the convex portion 3 is provided at the position 10z of the antinode in the Y-direction bending primary vibration mode, the large vibration in the Z direction generates at the contact portion 3a. Since the contact portion 3a largely vibrates in the Z direction, it is possible to certainly eliminate the water which coheres at the contact place between the contact portion 3a and the slider 4. The mode like this is called an upthrusting mode.

Figure 5:
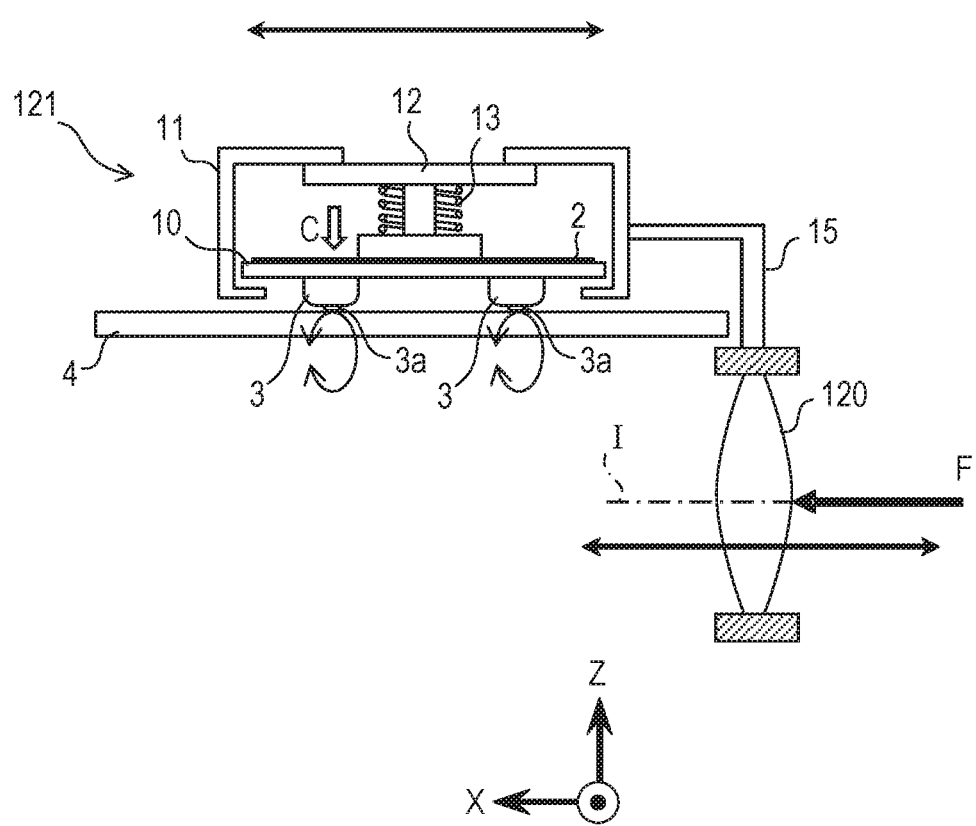
FIG. 5 is a diagram for illustrating the actuator, an AF (auto-focus) lens, and a coupling member for coupling the actuator and the AF lens.

By combining the primary and secondary bending vibration modes with each other, as illustrated in FIG. 5, elliptic motion is excited at each of the contact portions 3a. Since the contact portion 3a is pressurized and in contact with the slider 4, it is possible to drive the vibrator 10 in one direction (the X direction in FIG. 5) along the slider 4.

When the frequencies of the AC voltages applied to the electrodes A1 and A2 provided on the piezoelectric element 2 are changed, it is possible to change the size of the ellipse while maintaining the elliptic ratio of the elliptic motion. When the frequency of the AD voltage to be applied to the piezoelectric element 2 is approximated to a resonance frequency fr of the vibrator 10, the size of the ellipse of the elliptic motion of the contact portion 3a becomes large, so that the driving speed of the vibrator 10 increases. On the other hand, when the frequency of the AD voltage to be applied to the piezoelectric element 2 is distanced from the resonance frequency fr of the vibrator 10, the size of the ellipse of the elliptic motion of the contact portion 3a becomes small, so that the driving speed of the vibrator 10 decreases.

When the phase difference of the AC voltages V1 and V2 applied to the electrodes A1 and A2 provided on the piezoelectric element 2 is changed, it is possible to change the elliptic ratio of the elliptic motion of the contact portion 3a. When the phase difference of the AC voltages V1 and V2 is 0 degrees, the same-phase AC voltages V1 and V2 are applied to the two electrodes A1 and A2 provided on the piezoelectric element 2, so that the vibration in the Y-direction bending primary mode, i.e., the vibration in the upthrusting mode, is excited in the vibrator 10. When the phase difference of the AC voltages V1 and V2 is 180 degrees, the reverse-phase AC voltages V1 and V2 are applied to the two electrodes A1 and A2 provided on the piezoelectric element 2, so that the vibration in the X-direction bending secondary mode, i.e., the vibration in the feeding mode, is excited in the vibrator 10. Further, when the phase difference of the AC voltages V1 and V2 is within the range of 0 degrees to 180 degrees, the ratio of the amplitude of the Z direction being the upthrusting mode and the amplitude of the X direction being the feeding mode changes according to the magnitude of the phase difference of the AC voltages V1 and V2. Thus, the elliptic motion of the elliptic ratio according to the phase difference of the AC voltages V1 and V2 is excited at the contact portion 3a.

FIG. 5 is the diagram for illustrating the actuator 121, the AF lens 120, and the coupling member for coupling them.

The actuator 121 comprises the vibrator 10, a holding unit 11 which indirectly holds the vibrator 10 via a pressurizing member 12 and a biasing member 13, and the pressurizing member 12 which pressurizes the vibrator 10 via the biasing member 13, and the biasing member 13 which biases the vibrator 10.

A compression spring or the like is used as the biasing member 13. Since the vibrator 10 is pressurized in the direction of an arrow C in FIG. 5 by the pressurizing member 12 via the biasing member 13, the vibrator 10 is pressurized and in contact with the slider 4. Since the vibrator 10 is pressurized and in contact with the slider 4, the position of the actuator 121 is held by the friction force between the vibrator 10 and the slider 4. Here, the friction force for holding the position of the actuator 121 is also called holding force.

Since the vibrator 10 is pressurized and in contact with the slider 4, it is possible to drive the actuator 121 in the X direction, i.e., in the direction of the optical axis I, by applying the AC voltages V1 and V2 with the desired frequencies and phase difference to the electrodes A1 and A2 provided on the piezoelectric element 2 of the vibrator 10.

As illustrated in FIG. 5, the AF lens 120 is connected to the actuator 121 via a coupling member 15. Consequently, when the actuator 121 is driven in the direction of the optical axis I, the AF lens 120 is driven in the direction of the optical axis I as well as the actuator 121.

When the actuator 121 has stopped, the actuator 121 is fixed to the slider 4 by the holding force (friction force). Consequently, even if external force F is applied to the AF lens 120, the AF lens 120 does not move.

Figure 6:
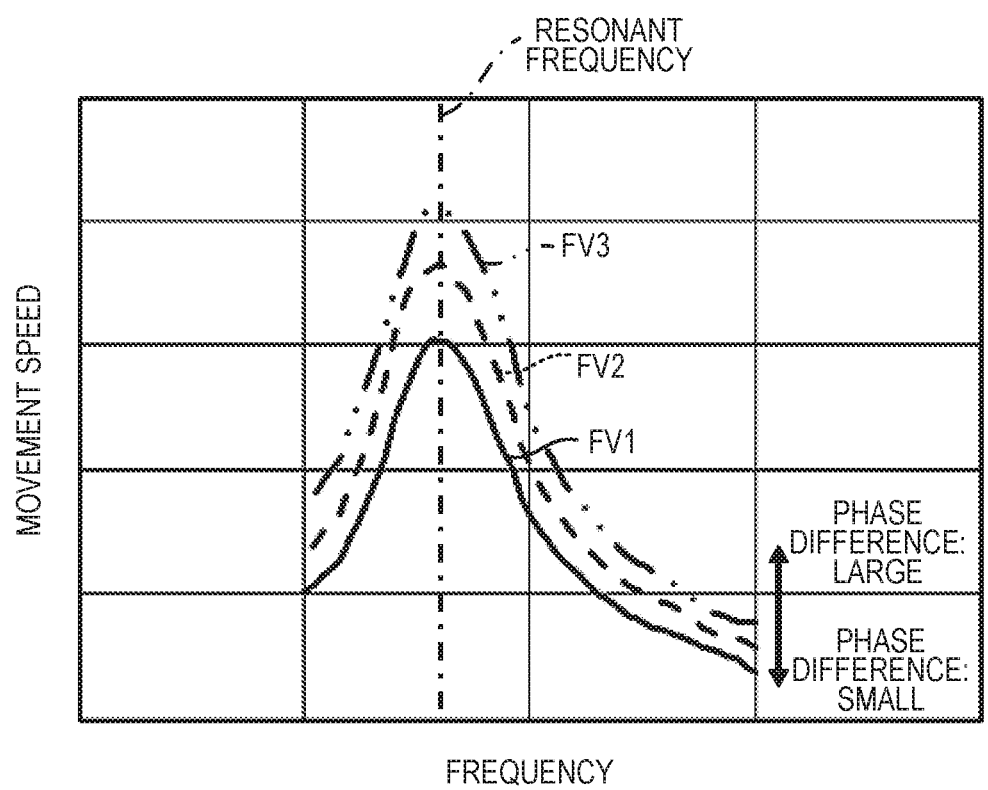
FIG. 6 is a graph for indicating the relation among the applying condition of the AC voltages to be applied when driving the actuator, the phase difference of the AC voltages, and the movement speed of the actuator.

FIG. 6 is the graph for indicating the relation among the frequencies of the AC voltages V1 and V2 to be applied to the electrodes provided on the piezoelectric element 2, the phase difference of these AC voltages, and the movement speed of the actuator 121. The horizontal axis indicates the frequencies of the AC voltages V1 and V2 to be applied to the electrodes A1 and A2 provided on the piezoelectric element 2. The alternate long and short dash line indicates the resonance frequency of the vibrator 10. Symbol FV1 indicates a case where the phase difference of the AC voltages V1 and V2 is set to relatively small, symbol FV2 indicates a case where the phase difference of the AC voltages V1 and V2 is set to intermediate, and symbol FV3 indicates a case where the phase difference of the AC voltages V1 and V2 is set to relatively large.

As can be understood from FIG. 6, the movement speed of the actuator 121 increases as the frequencies of the AC voltages V1 and V2 to be applied to the electrodes A1 and A2 provided on the piezoelectric element 2 are approximated to the resonance frequency of the vibrator 10.

Besides, the movement speed of the actuator 121 increases as the phase difference of the AC voltages V1 and V2 to be applied to the electrodes A1 and A2 provided on the piezoelectric element 2 is increased.

In a case where the characteristic such as the case FV1 is being obtained when the phase difference of the AC voltages V1 and V2 to be applied to the electrodes A1 and A2 provided on the piezoelectric element 2 is, e.g., 20 degrees, the characteristic such as the case FV2 is obtained when the phase difference of the AC voltages V1 and V2 is increased. Then, the characteristic such as the case FV3 is obtained when the phase difference of the AC voltages V1 and V2 is further increased.

The actuator driving circuit 123 drives the actuator 121 by appropriately controlling the frequencies and the phase difference of the AC voltages V1 and V2 to be applied to the electrodes A1 and A2 provided on the piezoelectric element 2, on the basis of the driving signal from the AF lens control unit 104.

Figure 7:
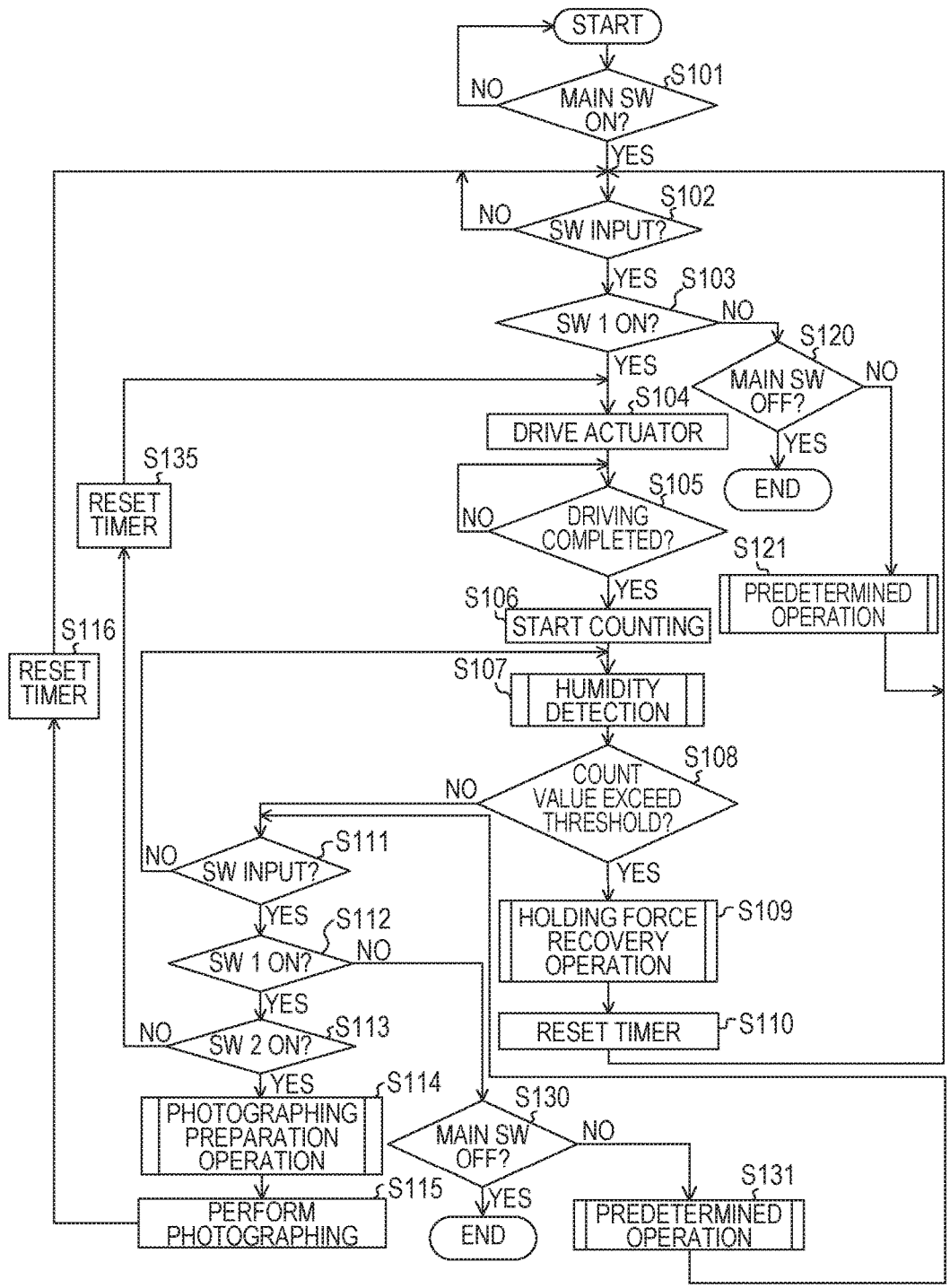
FIG. 7 is a flow chart for describing the main flow of an operation by the imaging apparatus according to the first embodiment.
Figure 8:
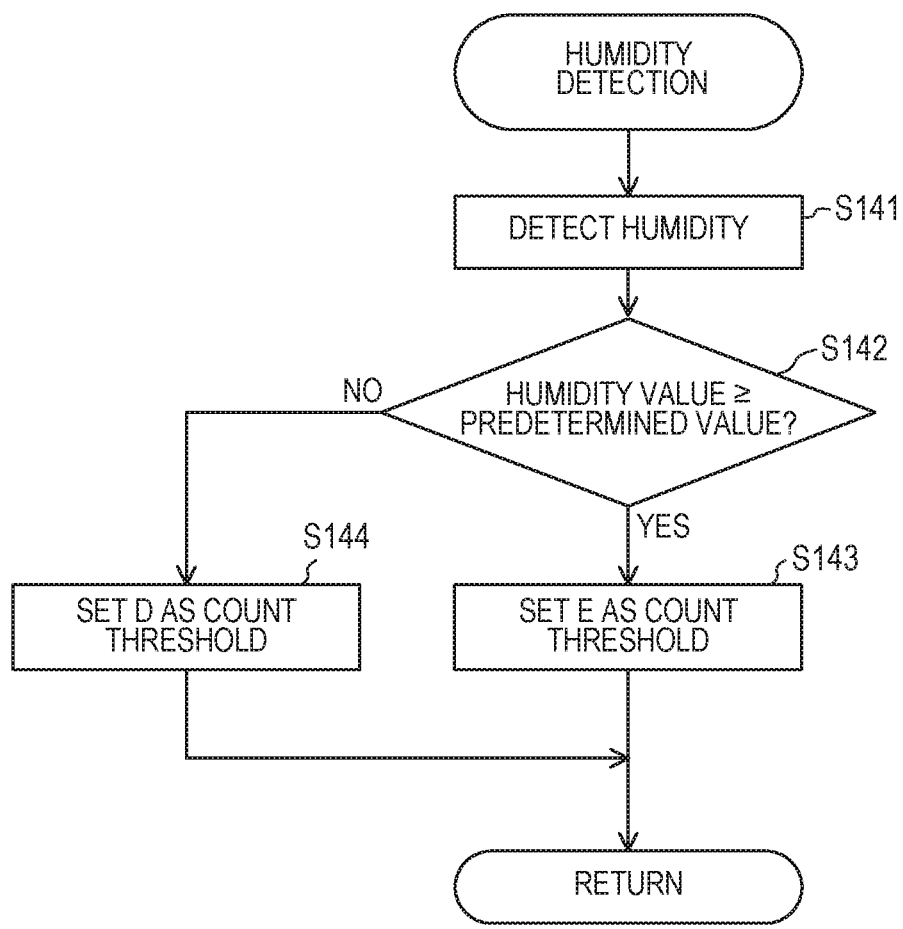
FIG. 8 is a flow chart for describing a humidity detecting operation.
Figure 9:
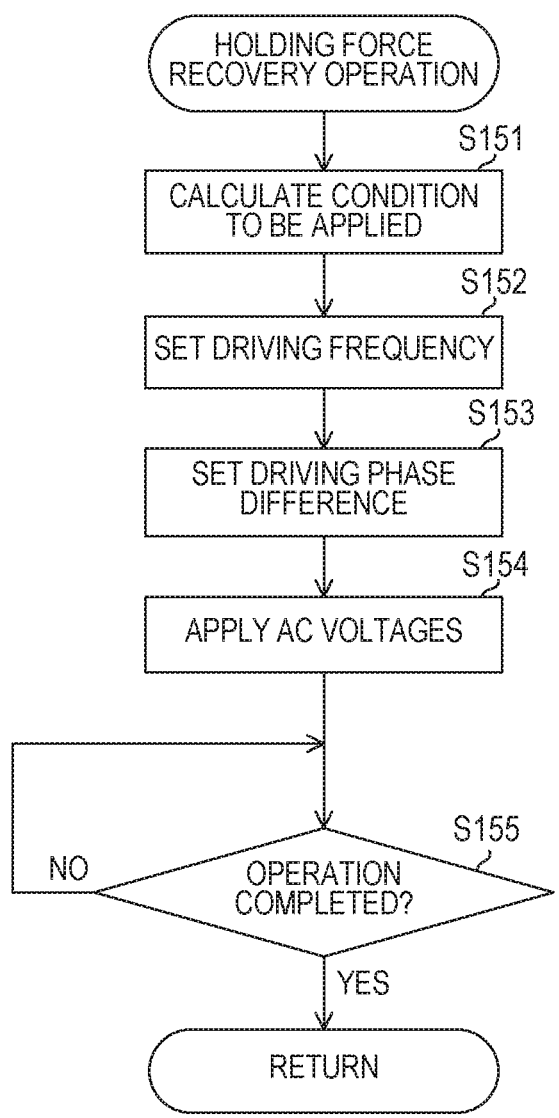
FIG. 9 is a flow chart for describing a holding force recovery operation.

Subsequently, the operation which is performed by the imaging apparatus according to the present embodiment will be described with reference to FIGS. 7 to 9. FIG. 7 is the flow chart for describing the main flow of the operation by the imaging apparatus according to the present embodiment. The operations according to the flow charts illustrated in FIGS. 7 to 9 are performed on the premise that the body CPU 109 executes the necessary programs.

In S101, the body CPU 109 decides whether or not the main SW 195 is ON. When the main SW 195 is not ON (S101: NO), the body CPU stands by until the main SW 195 is ON. When the main SW 195 is ON (S101: YES), the inputs of various switches are confirmed (S102).

In S102, the body CPU 109 decides whether or not the various switches such as the release SW 191 and the like are operated and input. When the various switches are not operated and input (S102: NO), the body CPU stands by until the various switches are operated and input. When the various switches are operated and input (S102: YES), the input of the release SW 191 is confirmed (S103).

In S103, the body CPU 109 decides whether or not the SW 1 of the release SW 191 is ON by the operation of the release button 191a, that is, whether or not the half depression operation is performed. When the SW 1 of the release SW 191 is ON (S103: YES), the actuator 121 is driven (S104). When the switch other than the SW 1 of the release SW 191 is operated and input (S103: NO), the state of the main SW 195 is confirmed (S120).

In S104, the body CPU 109 drives the actuator 121 to perform, as a first operation, the photographing preparation operation which is the operation for preparation of photographing. More specifically, the photometric operation, a ranging operation and the like are performed. The aperture size of the diaphragm 140 is controlled based on the result of the photometric operation, and the actuator 121 is driven based on the result of the ranging operation. By driving the actuator 121, the AF lens 120 is driven, that is, a focusing operation is performed.

Figure 10:
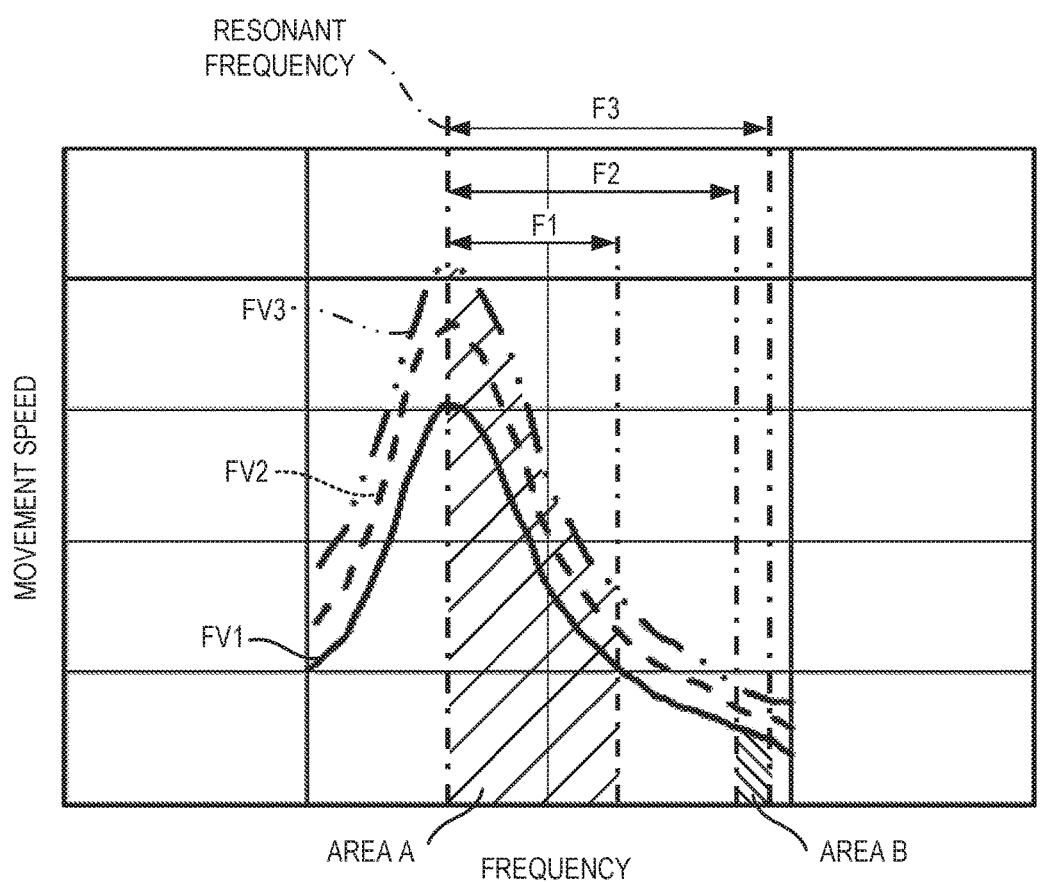
FIG. 10 is a graph for indicating the applying condition of the AC voltages to be applied when driving the actuator, and the applying condition of the AC voltages to be applied when performing the holding force recovery operation.

To adjust the position of the AF lens 120, the frequencies and the phase difference of the AC voltages V1 and V2 applied to the electrodes A1 and A2 provided on the piezoelectric element 2 are properly set, and the actuator 121 is driven. FIG. 10 is the graph for indicating the applying condition of the AC voltage to be applied when driving the actuator, and the applying condition of the AC voltage to be applied when performing the holding force recovery operation. In the graph, the horizontal axis indicates the frequencies of the AC voltages V1 and V2 to be applied to the electrodes A1 and A2 provided on the piezoelectric element 2, and the vertical axis indicates the movement speed of the actuator 121. The alternate long and short dash line indicates the resonance frequency fr of the vibrator 10. The symbol FV1 indicates the case where the phase difference of the AC voltages V1 and V2 is set to relatively small, the symbol FV2 indicates the case where the phase difference of the AC voltages V1 and V2 is set to intermediate, and the symbol FV3 indicates the case where the phase difference of the AC voltages V1 and V2 is set to relatively large. An area A indicates an example of the applying condition of the AC voltages V1 and V2 to be applied when driving the actuator 121 to adjust the position of the AF lens 120, and an area B indicates an example of the applying condition of the AC voltages V1 and V2 to be applied when performing the holding force recovery operation.

When driving the actuator 121 to adjust the position of the AF lens 120, as illustrated in FIG. 10, the frequencies of the AC voltages V1 and V2 to be applied to the electrodes A1 and A2 provided on the piezoelectric element 2 are set within, e.g., the range of (fr) to (fr+F1). By properly setting the frequencies of the AC voltages V1 and V2 to be applied to the electrodes A1 and A2 within the range of (fr) to (fr+F1) and properly setting the phase difference of the AC voltages V1 and V2, it is possible to appropriately drive the actuator 121 at a desired speed. After completing the adjustment of the position of the AF lens 120, that is, after completing the photographing preparation operation, it decides whether or not the driving of the AF lens 120 is completed (S105).

In S105, the AF lens control unit 104 decides whether or not the AF lens 120 has been driven up to a predetermined position by the actuator 121. When the AF lens 120 is not yet driven up to the predetermined position (S105: NO), it stands by until the AF lens 120 is driven up to the predetermined position. On the other hand, when the AF lens 120 has been driven up to the predetermined position (S105: YES), the timer 109a starts counting because the driving of the actuator 121 has been completed (S106).

In S106, the body CPU 109 causes the timer 109a to start counting. Thus, the body CPU 109 can detect the time during which the actuator 121 is held at the predetermined position.

In S107, the body CPU 109 determines a threshold of the count value of the timer 109a. Incidentally, the detail of humidity detection will later be described with reference to FIG. 8.

In S108, the body CPU 109 decides whether or not the count value of the timer 109a determined in S107 exceeds the threshold. When the count value exceeds the threshold (S108: YES), the holding force recovery operation is performed as a second operation (S109). On the other hand, when the count value does not exceed the threshold (S108: NO), the input states of the various switches are confirmed (S111).

In S109, the body CPU 109 performs the holding force recovery operation for the actuator 121. Incidentally, the detail of the holding force recovery operation will later be described with reference to FIG. 9.

The reason why the holding force recovery operation is performed in S109 when the AF lens 120 is being held at the predetermined position is as follows. That is, if the actuator 121 is held at the same position on the surface of the slider 4 until the count value of the timer 109a exceeds the threshold, minute water (or moisture) in the air coheres at the contact place between the contact portion 3a and the slider 4 of the actuator 121 with a lapse of time. Thus, since the friction force decreases, the holding force of the actuator 121 decreases. Then, if external force is applied to the camera 100 in the state that the holding force of the actuator 121 has decreased, there is a possibility that the actuator 121 moves. Then, if the actuator 121 moves, the AF lens 120 connected to the actuator 121 via the coupling member 15 moves accordingly from the in-focus position, so that an out of focus occurs. The present embodiment aims to, by recovering the holding force of the actuator 121 by the holding force recovery operation, prevent that the AF lens 120 moves even if the external force is applied to the camera 100. That is, the holding force recovery operation is the operation for performing maintenance of the AF lens 120.

In S110, the count value of the timer 109a is reset to zero. Then, the process returns to S102 to repeat the series of the above operations.

In S111, the body CPU 109 confirms whether or not the various switches such as the release SW 191 and the like are operated and input. When the various switches are not operated and input (S111: NO), the process returns to S107 to repeat the series of the above operations. On the other hand, when the various switches are operated and input (S111: YES), the operation of the release button 191a is confirmed (S112).

In S112, the body CPU 109 decides whether or not the SW 1 of the release SW 191 is ON by the operation of the release button 191a. When the SW 1 of the release SW 191 is ON (S112: YES), the input of the SW 2 of the release SW 191 is confirmed (S113). When the switch other than the SW 1 of the release SW 191 is operated and input (S112: NO), the input of the main SW 195 is confirmed (S130).

In S113, the body CPU 109 decides whether or not the SW 2 of the release SW 191 is ON by the operation of the release button 191a. When the SW 2 of the release SW 191 is ON (S113: YES), the photographing preparation operation is performed (S114). When the SW 2 of the release SW 191 is OFF (S113: NO), the timer 109a is reset because the photographing preparation operation is not performed (S135).

In S114, the photographing preparation operation which is the operation for preparation of photographing is performed. Since the photographing preparation operation is the same as that described in S104, the description thereof will be omitted.

In S115, the photographing operation is performed. Since the photographing operation itself is well known, the detailed description thereof will be omitted.

In S116, the body CPU 109 resets the count value of the timer 109a to zero. Then, the process returns to S102 to repeat the series of the above operations.

In S120, the body CPU 109 decides whether or not the main SW 195 is OFF. When the main SW 195 is ON (S120: NO), a predetermined operation is performed based on the user's operation (S121). When the main SW 195 is OFF (S120: YES), the body CPU 109 turns off the power supply of the camera 100, and ends the flow of the series of the operations.

In S121, a predetermined operation is performed based on the operations of the various switches performed in S103. Then, the process returns to S102 to repeat the series of the above operations.

In S130, the body CPU 109 decides whether or not the main SW 195 is OFF. When the main SW 195 is ON (S130: NO), a predetermined operation is performed based on the user's operation (S131). When the main SW 195 is OFF (S130: YES), the body CPU 109 turns off the power supply of the camera 100, and ends the flow of the series of the operations.

In S131, the predetermined operation is performed based on the operations of the various switches performed in S112. Then, the process returns to S111 to repeat the series of the above operations.

In S135, the body CPU 109 resets the count value of the timer 109a. Then, the process returns to S104 to repeat the series of the above operations.

Hereinafter, the operation flow for the humidity detection to be performed in S107 will be described with reference to FIG. 8. FIG. 8 is the flow chart for describing the humidity detecting operation.

In S141, the temperature and humidity sensor 199 detects the humidity in the camera 100.

In S142, the body CPU 109 decides whether or not the value of the humidity detected by the temperature and humidity sensor 199 in S141 is equal to or higher than a predetermined value. Here, the predetermined value is equivalent to the value, e.g., 70%, which indicates a high-humidity state. When the humidity value is equal to or higher than the predetermined value (S142: YES), the threshold of the count value (count threshold) of the timer 109a is set (S143). On the other hand, when the humidity value is lower than the predetermined value (S142: NO), the threshold of the count value of the timer 109a which is different from that in the case where the humidity value is equal to or higher than the predetermined value is set (S144). Incidentally, since the predetermined value is the value which is changed by the pressurizing force of the biasing member 13, this value is not specifically limited.

In S143, "E" is set as the threshold of the count value of the timer 109a, and the process returns to the main flow illustrated in FIG. 7.

In S144, "D" is set as the threshold of the count value of the timer 109a, and the process returns to the main flow illustrated in FIG. 7.

The threshold D and the threshold E satisfy the relation of D>E. Since the cohering speed of the water which coheres at the contact place between the contact portion 3a and the slider 4 of the actuator 121 increases as the humidity increases, the decreasing speed of the friction force is accelerated. Namely, in the state that the humidity is high, the time during which the holding force of the actuator 121 decreases is short as compared with the state that the humidity is not high. Consequently, when the humidity is high, it is possible to reduce the decreasing amount of the holding force of the actuator 121 before the holding force recovery operation, by bringing forward the later-described timing of the holding force recovery operation of the actuator 121, as comparing with the timing in the state that the humidity is not high.

Thus, by changing the timing of the holding force recovery operation of the actuator 121 according to the humidity, it is possible, irrespective of the humidity environment in which the camera 100 is put, to prevent that the AF lens 120 deviates, even in the case where the external force is applied to the camera 100.

Hereinafter, the holding force recovery operation to be performed in S109 will be described with reference to FIG. 9. FIG. 9 is the flow chart for describing the holding force recovery operation.

In S151, the body CPU 109 calculates the condition, i.e., the frequencies and the phase difference of the AC voltages V1 and V2, to be applied to the piezoelectric element 2 of the actuator 121. Here, the applying condition of the AC voltages V1 and V2 to be applied to the electrodes A1 and A2 in the holding force recovery operation is determined to be within the range of, e.g., the area B illustrated in FIG. 10. That is, the frequencies of the AC voltages V1 and V2 to be applied to the electrodes A1 and A2 are determined to be within the range from the frequency apart from the resonance frequency fr of the vibrator 10 by F2 to the frequency of F3 farther apart from the resonance frequency than F2, i.e., the range of (fr+F2) to (fr+F3). Further, the phase difference of the AC voltages V1 and V2 to be applied to the electrodes A1 and A2 is determined such that the relation between the frequencies of the AC voltages V1 and V2 and the movement speed comes to be equal to or smaller than FV1. Here, F2 is sufficiently larger than F1, and F3 is larger than F2. That is, the frequency of the area B which is the applying condition of the AC voltages V1 and V2 in the holding force recovery operation is sufficiently higher than the frequency of the area A which is the applying condition of the AC voltages V1 and V2 in the photographing preparation operation.

The reason why the frequencies of the AC voltages V1 and V2 to be applied to the electrodes A1 and A2 in the holding force recovery operation are set to relatively high is as follows. That is, by setting the frequencies of the AC voltages V1 and V2 to be applied to the electrodes A1 and A2 to high, the number of times of the contact between the contact portion 3a and the slider 4 of the actuator 121 increases. When the number of times of the contact between the contact portion 3a and the slider 4 of the actuator 121 increases, the water which cohered at the contact place between the contact portion 3a and the slider 4 of the actuator 121 can surely be eliminated. For the reason described above, in the present embodiment, the frequencies of the AC voltages V1 and V2 to be applied to the electrodes A1 and A2 in the holding force recovery operation are set to relatively high.

Thus, the applying condition of the AC voltages V1 and V2 to be applied to the electrodes A1 and A2 provided on the piezoelectric element 2 of the actuator 121 is calculated.

In S152, the frequencies (i.e., the driving frequency) of the AC voltages V1 and V2 to be applied to the piezoelectric element 2 are set according to the result of the calculation in S151, and the value of the driving frequency is output to the AF lens control unit 104 provided in lens CPU 103. Then, the AF lens control unit 104 outputs the value of the driving frequency to the actuator driving circuit 123.

In S153, the phase difference (i.e., the driving phase difference) of the AC voltages V1 and V2 to be applied to the electrodes A1 and A2 of the piezoelectric element 2 is set according to the result of the calculation in S151, and the value of the driving phase difference is output to the AF lens control unit 104 provided in lens CPU 103. Then, the AF lens control unit 104 outputs the value of the driving phase difference to the actuator driving circuit 123.

In S154, the actuator driving circuit 123 applies the AC voltages V1 and V2 to the electrodes A1 and A2 of the piezoelectric element 2 of the actuator 121, based on the driving frequency set in S152 and the driving phase difference set in S153. Then, the actuator 121 moves at a predetermined speed. Thus, the water which cohered at the contact place between the contact portion 3a and the slider 4 of the actuator 121 is eliminated by the vibration, so that the holding force is recovered. As a result, as illustrated in FIG. 5, even if the external force F is applied to the AF lens 120, the AF lens 120 is not moved. Thus, it is possible to prevent the out of focus which occurs due to the movement of the AF lens 120.

In S155, the body CPU 109 decides whether or not the holding force recovery operation is completed. When the holding force recovery operation is not completed (S155: NO), the applying of the AC voltages V1 and V2 to the electrodes A1 and A2 provided on the piezoelectric element 2 is continued. On the other hand, when the holding force recovery operation is completed (S155: YES), the process returns to the main flow illustrated in FIG. 7.

As just described, according to the present embodiment, the timing when performing the holding force recovery operation is changed according to the humidity in the camera 100. Thus, since it is possible to recover the holding force of the actuator 121 at appropriate timing even under the high-humidity environment. Therefore, it is possible to provide the imaging apparatus which can prevent the occurrence of the out of focus in the photographing preparation operation and thus maintain the good performance.

Second Embodiment

Figure 11:
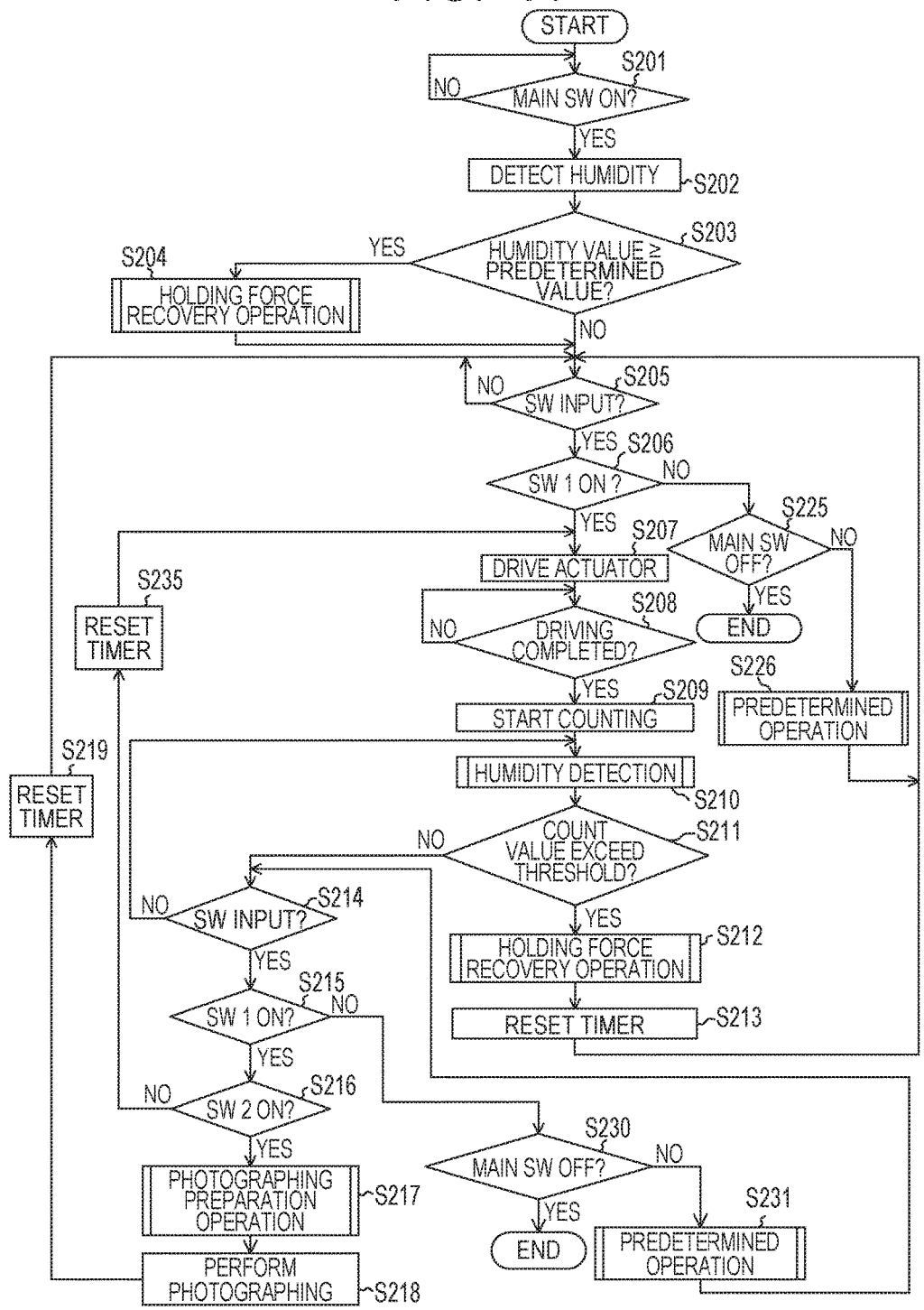
FIG. 11 is a flow chart for describing the main flow of an operation by the imaging apparatus according to the second embodiment of the present invention.

Subsequently, the second embodiment of the present invention will be described. The present embodiment is different from the first embodiment in the point that the humidity detection is performed by the temperature and humidity sensor 199 also when the main SW 195 of the camera 100 is ON and the holding force recovery operation is performed according to the result of the humidity detection. FIG. 11 is a flow chart for describing the main flow of the operation by the imaging apparatus according to the present embodiment. The imaging apparatus according to the present embodiment will be described with reference to FIG. 11.

Since the process of S201 is the same as that of S101 in the first embodiment, the description thereof will be omitted. When the main SW 195 is ON (S201: YES), the humidity detection is performed (S202).

In S202, as well as S141 in the first embodiment, the temperature and humidity sensor 199 detects the humidity in the camera 100.

In S203, the body CPU 109 decides whether or not the value of the humidity detected in S202 is equal to or higher than the predetermined value. When the value of the detected humidity is equal to or higher than the predetermined value (S203: YES), the holding force recovery operation is performed (S204). On the other hand, when the value of the detected humidity is lower than the predetermined value (S203: NO), the input states of the various switches are confirmed (S205). Incidentally, the predetermined value is the same as the predetermined value used in S142 of the first embodiment.

In S204, as well as S109 in the first embodiment, the body CPU 109 performs the holding force recovery operation (S151 to S155) indicated by the flow chart of FIG. 9, and thus recovers the holding force of the actuator 121.

The reason why the holding force recovery operation is performed according to the value of the detected humidity after the main SW 195 was ON is as follows.

When the main SW 195 is switched from OFF to ON in the state that the camera 100 is put under the high-humidity environment, there is a possibility that the holding force of the actuator 121 has decreased because the water had cohered at the contact place between the contact portion 3a and the slider 4 of the actuator 121. Accordingly, the humidity detection is performed by the temperature and humidity sensor 199 when the main SW 195 is ON, and the holding force recovery operation of the actuator 121 is performed when the value of the humidity value is equal to or larger than the predetermined value, that is, when the camera 100 is put under the high-humidity environment. Thus, it is possible to prevent that the AF lens 120 deviates even if the external force is applied to the AF lens 120.

Since the processes of S205 to S219 are the same as those of S102 to S116 in the first embodiment, the description thereof will be omitted. Further, since the processes of S225 to S226, S230 to S231 and S235 are the same as those of S120 to S121, S130 to S131 and S135 in the first embodiment, the description thereof will be omitted.

As just described, in the present embodiment, the holding force recovery operation is performed based on the value of the humidity in the camera 100 at the moment when the power supply of the camera 100 is turned on, that is, at the moment when the main SW 195 is ON. Thus, as well as the first embodiment, it is possible to prevent the occurrence of the out of focus even when the camera 100 is used under the high-humidity environment. Therefore, it is possible to provide the imaging apparatus which has the good performance.

Third Embodiment

Figure 12:
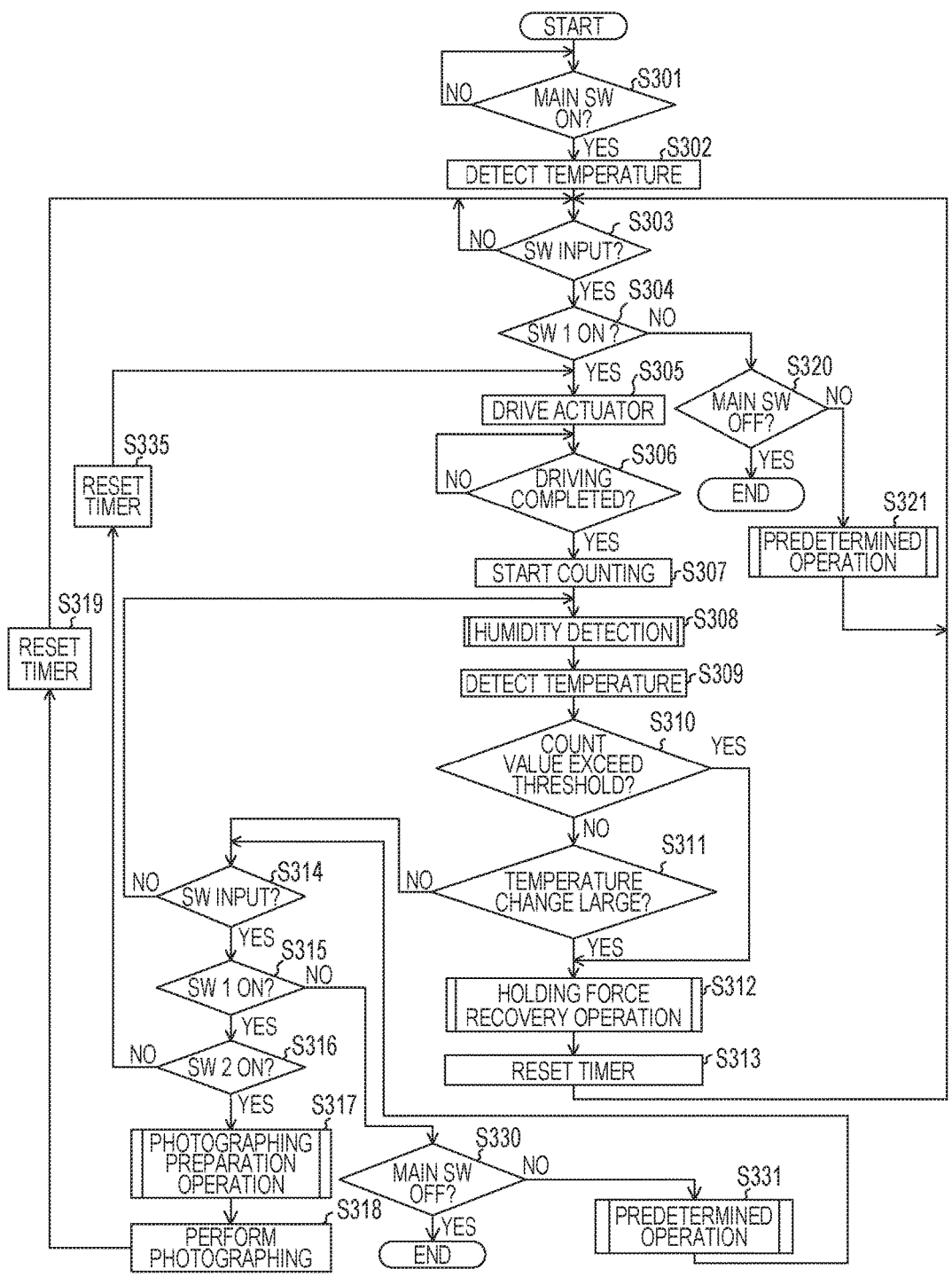
FIG. 12 is a flow chart for describing the main flow of an operation by the imaging apparatus according to the third embodiment of the present invention.

Subsequently, the third embodiment of the present invention will be described. The present embodiment is different from the first and second embodiments in the point that the temperature detection of the camera 100 is performed by the temperature and humidity sensor 199 and the holding force recovery operation is performed according to the change amount of the temperature. FIG. 12 is a flow chart for describing the main flow of the operation by the imaging apparatus according to the third embodiment. Hereinafter, the imaging apparatus according to the third embodiment will be described with reference to FIG. 12.

Since the process of S301 is the same as that of S101 in the first embodiment, the description thereof will be omitted. When the main SW 195 is ON (S301: YES), the temperature detection is performed (S302).

In S302, the temperature and humidity sensor 199 detects the temperature in the camera 100.

Since the processes of S303 to S307 are the same as those of S102 to S106 in the first embodiment, the description thereof will be omitted.

In S308, as well as the process of S107 in the first embodiment, the humidity detection is performed (S141 to S144). Thus, the body CPU 109 determines the threshold of the count value of the timer 109a.

In S309, as well as the process of S302, the temperature and humidity sensor 199 detects the temperature in the camera 100. The detected temperature is stored in the memory 198 by the body CPU 109.

In S310, the body CPU 109 decides whether or not the count value of the timer 109a determined in S308 exceeds the threshold. When the count value exceeds the threshold (S310: YES), the holding force recovery operation is performed (S312). On the other hand, when the count value does not exceed the threshold (S310: NO), the temperature change is confirmed (S311).

In S311, the body CPU 109 decides whether or not the temperature change in the camera 100 is larger than a predetermined value, by comparing the temperature detected in S302 with the temperature detected in S309. When the temperature change in the camera 100 is larger than the predetermined value (S311: YES), the holding force recovery operation is performed (S312). On the other hand, when the temperature change is equal to or smaller than the predetermined value (S311: NO), the input states of the various switches are confirmed (S314). Here, the predetermined value in S311 indicates the temperature difference by which dew condensation possibly occurs. Incidentally, when the process advances to S311 after returning to S303, S305 or S308, the change amount of the temperature is decided in the following manner. That is, the body CPU 109 reads the previously detected temperature from the memory 198, compares the temperature detected this time in S309 with the previously detected temperature, and decides whether or not the change amount of the temperature is larger than the predetermined value.

The reason why the holding force recovery operation is performed when the temperature change in the camera 100 is large in S311 is as follows.

For example, when the temperature in the camera 100 is abruptly transitioned or changed from the low temperature environment of, e.g., 5° C. to the normal temperature environment of, e.g., 25° C., there is a possibility that dew condensation occurs on the surface of the slider 4. When the environment change which causes the dew condensation occurs, there is a possibility that water coheres at the contact place between the contact portion 3a and the slider 4 of the actuator 121 and thus the holding force of the actuator 121 decreases. Thus, the temperature change is detected while the actuator 121 is being held at the same position on the surface of the slider 4, that is, while the timer 109a is performing the counting, and it is confirmed whether or not there is a possibility that the dew condensation occurs on the surface of the slider 4. When the temperature change is larger than the predetermined value and there is the possibility that the dew condensation occurs, the holding force recovery operation of the actuator 121 is performed before the photographing preparation operation in S317. Thus, it is possible to prevent that the AF lens 120 deviates even if the external force F is applied to the AF lens 120.

Since the processes of S312 to S321, S330 to S331 and S335 are the same as those of S109 to S116, S120 to S121, S130 to S131 and S135 in the first embodiment, the description thereof will be omitted.

As just described, in the present embodiment, the holding force recovery operation of the actuator 121 is performed when the temperature change which may cause the dew condensation occurs. Thus, it is possible to provide the imaging apparatus which has the good performance even in the case where the temperature change which may cause the dew condensation occurs.

Modified Embodiment

The present invention is not limited to the embodiments as described above, and various modifications can be performed. For example, although the case where the AF lens 120 moves in the direction of the optical axis I while the holding force recovery operation is being performed has been described in the above embodiments, the present invention is not limited to this. For example, the holding force recovery operation may be performed by exciting the vibration of the upthrusting mode in the vibrator 10. When exciting the vibration of the upthrusting mode in the vibrator 10, it only has to set the phase difference of the AC voltages V1 and V2 applied to the electrodes A1 and A2 provided on the piezoelectric element 2 to 0 degrees. That is, it only has to apply the same-phase AC voltages V1 and V2 to the electrodes A1 and A2 provided on the piezoelectric element 2. When the vibrator 10 is vibrated in the upthrusting mode, the AF lens 120 does not move in the holding force recovery operation because the actuator 121 does not move in the X-axis direction, i.e., the direction of the optical axis I. For this reason, even if the user looks the object through the eyepiece 202 while the holding force recovery operation is being performed, the user does not easily notice the change of focus. As just described, it may be possible to perform the holding force recovery operation by exciting the vibration of the upthrusting mode in the vibrator 10.

Figure 13:
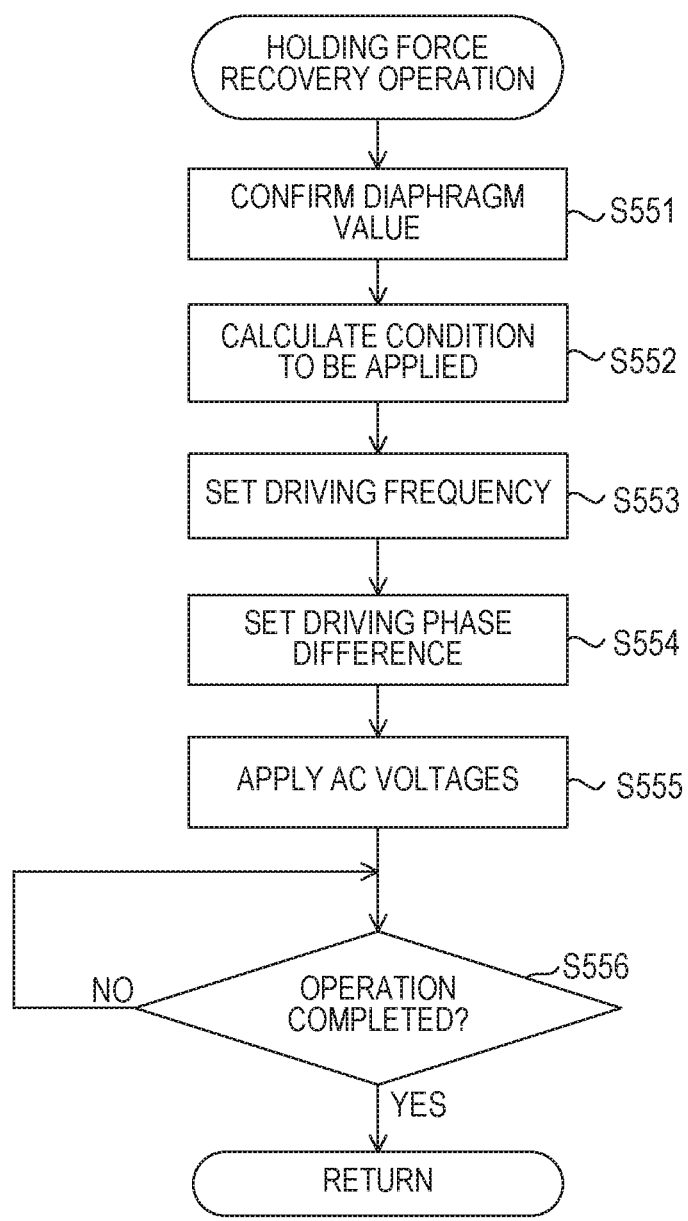
FIG. 13 is a flow chart for describing the holding force recovery operation according to the modified embodiment of the present invention.

Moreover, although the case where the AF lens 120 moves in the direction of the optical axis I to some extent while the holding force recovery operation is being performed has been exemplarily described in the above embodiments, the present invention is not limited to this. For example, the holding force recovery operation may be performed on condition that the displacement of the AF lens 120 in the direction of the optical axis I occurred in the case of the holding force recovery operation is within the range corresponding to the depth of field. Hereinafter, the operation to be performed when the holding force recovery operation is performed on condition that the displacement of the AF lens 120 in the direction of the optical axis I occurred in the case of the holding force recovery operation is within the range corresponding to the depth of field will be described with reference to FIG. 13. FIG. 13 is the flow chart for describing the holding force recovery operation according to the modified embodiment.

In S551, the body CPU 109 confirms the current diaphragm value of the diaphragm 140.

In S552, the body CPU 109 calculates the applying condition, i.e., the frequencies and the phase difference, of the AC voltages V1 and V2 to be applied to the electrodes A1 and A2 provided on the piezoelectric element 2 of the actuator 121. Since the depth of field is different according to the diaphragm value, the displacement amount of the AF lens 120 corresponding to the depth of field is different according to the diaphragm value of the diaphragm 140. For this reason, the applying condition of the AC voltages V1 and V2 to be applied to the electrodes A1 and A2 provided on the piezoelectric element 2 is calculated according to the diaphragm value of the diaphragm 140. Thus, the body CPU 109 calculates the applying condition of the AC voltages V1 and V2 such that the displacement of the AF lens 120 in the direction of the optical axis I occurred in the case of the holding force recovery operation is within the range corresponding to the depth of field.

The applying condition of the AC voltages V1 and V2 to be applied to the electrodes A1 and A2 provided on the piezoelectric element 2 is set as follow. That is, when the applying condition of the AC voltages V1 and V2 to be applied to the electrodes A1 and A2 is set to be within the range of the area A illustrated in FIG. 10, the movement speed of the AF lens 120 relatively increases. When the movement speed of the AF lens 120 is relatively high, there is a fear that the user notices the displacement of focus and thus recognizes that the AF lens 120 moved. Thus, in the present embodiment, the applying condition of the AC voltages V1 and V2 to be applied to the electrodes A1 and A2 provided on the piezoelectric element 2 is set to be within the range in which the movement speed of the AF lens 120 sufficiently decreases. More specifically, the applying condition of the AC voltages V1 and V2 to be applied to the electrodes A1 and A2 is set to be within the range of the area B illustrated in FIG. 10. The applying condition of the AC voltages V1 and V2 to be applied to the electrodes A1 and A2 is calculated in this way.

In S553, the frequencies (i.e., the driving frequency) of the AC voltages V1 and V2 to be applied to the electrodes A1 and A2 provided on the piezoelectric element 2 are set according to the calculation result in S552. The value of the set driving frequency is output to the AF lens control unit 104 provided in the lens CPU 103. The AF lens control unit 104 outputs the value of the driving frequency to the actuator driving circuit 123.

In S554, the phase difference (i.e., the driving phase difference) of the AC voltages V1 and V2 to be applied to the electrodes A1 and A2 provided on the piezoelectric element 2 is set according to the calculation result in S552. The value of the set driving phase difference is output to the AF lens control unit 104 provided in the lens CPU 103. The AF lens control unit 104 outputs the value of the driving phase difference to the actuator driving circuit 123.

In S555, the actuator driving circuit 123 applies the AC voltages V1 and V2 to the electrodes A1 and A2 provided on the piezoelectric element 2 of the actuator 121, based on the driving frequency set in S553 and the driving phase difference set in S554. Thus, the actuator 121 moves, at predetermined speed, within the displacement area corresponding to the depth of field. In association with this movement, the water which cohered at the contact place between the contact portion 3a and the slider 4 of the actuator 121 is eliminated by the vibration, so that the holding force is recovered.

In S556, it is decided by the body CPU 109 whether or not the holding force recovery operation is completed. When the holding force recovery operation is not completed (S556: NO), the AC voltages V1 and V2 are continuously applied to the electrodes A1 and A2 provided on the piezoelectric element 2. On the other hand, when the holding force recovery operation is completed (S556: YES), the process returns to the main flow.

As just described, it may be possible to perform the holding force recovery operation on condition that the displacement of the AF lens 120 in the direction of the optical axis I occurred in the case of the holding force recovery operation comes to be within the range corresponding to the depth of field.

Besides, in the above embodiments, although the case where the present invention is applied to the holding force recovery operation of the actuator 121 of the AF lens 120 has been exemplarily described, the present invention is not limited to this. For example, the present invention may be applied to the holding force recovery operation of the actuator of the zoom lens driving unit 111 which drives the zoom lens 110. The actuator of the zoom lens driving unit 111 performs an operation (i.e., a focal distance changing operation) which changes the focal distance by driving the zoom lens 110.

Figure 14:
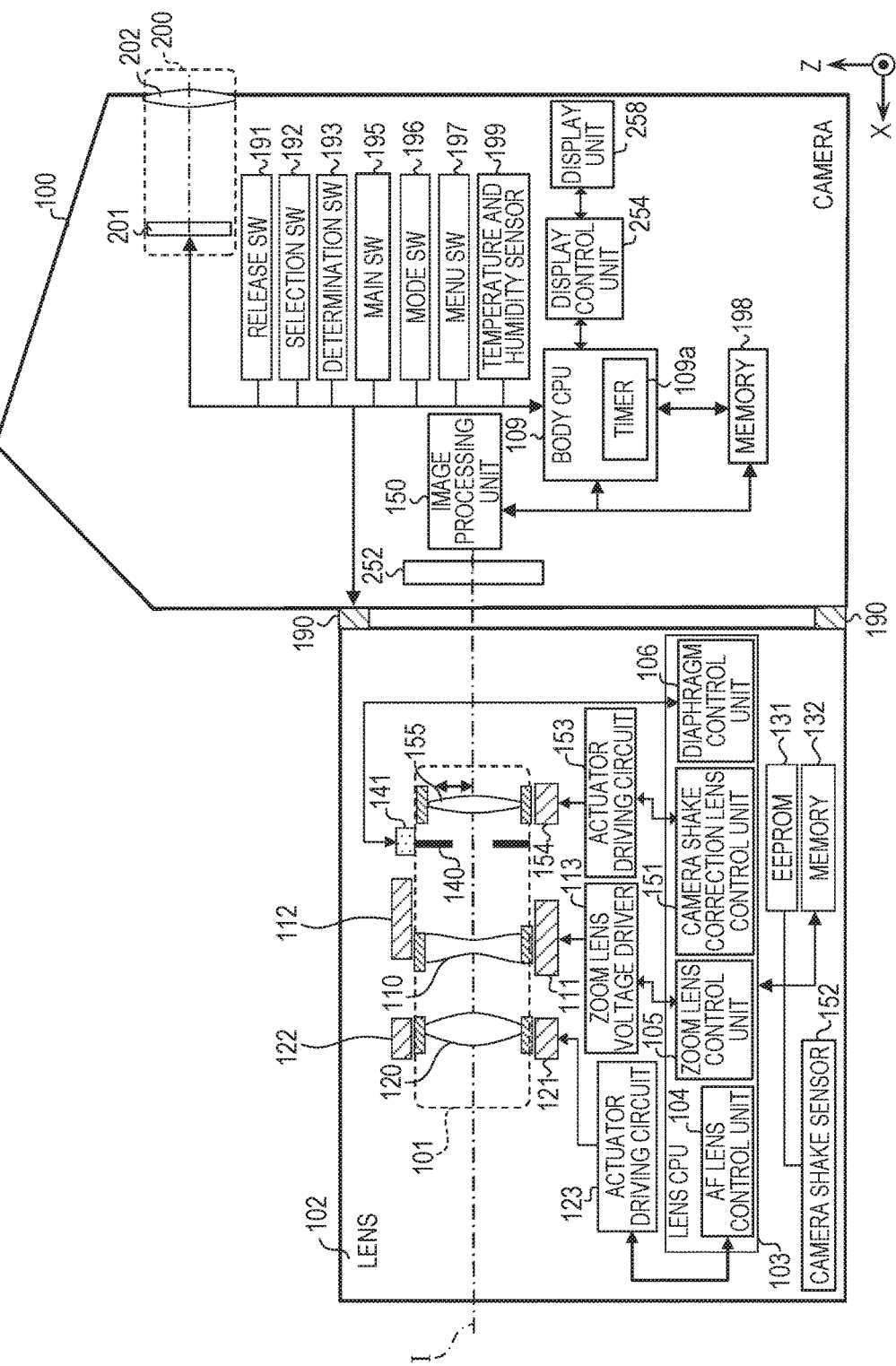
FIG. 14 is a block diagram for illustrating the imaging apparatus according to the modified embodiment.

Besides, in the above embodiments, although the case where the present invention is applied to the holding force recovery operation of the actuator 121 of the AF lens 120 has been exemplarily described, the present invention is not limited to this. The present invention may be applied to the holding force recovery operation of the actuator of a camera shake correction lens 155 for correcting a camera shake (or blurring). Moreover, the present invention may be applied to the holding force recovery operation of the actuator of the imaging element 252 for correcting the camera shake. FIG. 14 is a block diagram for illustrating the imaging apparatus according to the modified embodiment of the present invention. FIG. 14 corresponds to the case where the present invention is applied to the holding force recovery operation of the actuator of the camera shake correction lens 155. As illustrated in FIG. 14, the camera shake correction lens 155 is provided in the photographing optical system 101. The camera shake correction lens 155 is constituted to be driven by an actuator 154. The actuator 154 is controlled by a camera shake correction lens control unit 151 provided in the lens CPU 103, via an actuator driving circuit 153. A camera shake sensor 152 is connected to the lens CPU 103. For example, an angular speed sensor or the like is used as the camera shake sensor 152. The camera shake correction lens control unit 151 provided in the lens CPU 103 calculates the driving amount of the camera shake correction lens 155 based on the camera shake amount detected by the camera shake sensor 152. Then, a signal, i.e., a digital driving signal, indicating the driving amount calculated by the camera shake calculation is output from the camera shake correction lens control unit 151 to the actuator driving circuit 153. The actuator driving circuit 153 supplies electrical power to the actuator 154 based on the driving signal (driving voltage) output from the camera shake correction lens control unit 151. It only has to perform the holding force recovery operation same as the holding force recovery operation performed to the actuator 121 in the above embodiments, to the actuator 154. When the holding force recovery operation is performed to the actuator 154 which drives the camera shake correction lens 155, the camera shake correction lens 155 does not move in the direction perpendicular to the optical axis I even if external force is applied. Consequently, by performing the holding force recovery operation to the actuator 154 for driving the camera shake correction lens 155, it is possible to provide the imaging apparatus which can more surely perform the camera shake correction. The actuator 154, which drives the camera shake correction lens 155, performs the operation for correcting the camera shake, i.e., the camera shake correction operation (the shake correction operation) by driving the camera shake correction lens 155.

Besides, in the above embodiments, although the case where the timer 109a starts the counting after the driving of the actuator 121 was completed has been described, the present invention is not limited to this. For example, it is possible to have the same effect even in a case where the timer 109a starts the counting after the voltage application to the electrodes A1 and A2 of the piezoelectric element 2 was completed.

Besides, in the above embodiments, although the case where the temperature and humidity sensor 199 is not started when the main SW 195 of the camera 100 is OFF, the present invention is not limited to this. For example, when the humidity in the camera 100 is equal to or higher than a predetermined value, e.g., 70%, for a predetermined time until the main SW 195 of the camera 100 is ON, there is a possibility that the holding force of the actuator 121 decreases, because water coheres at the contact place between the contact portion 3a and the slider 4 of the actuator 121. For this reason, even when the main SW 195 of the camera 100 is OFF, the body CPU 109 starts the temperature and humidity sensor 199, detects the humidity in the camera 100, and stores the detected result in the memory 198. Then, when the humidity in the camera 100 exceeds the predetermined value for the predetermined time while the main SW 195 is being OFF, the body CPU 109 performs the holding force recovery operation. Thus, it is possible to provide the imaging apparatus which has the good performance even in the case where the camera 100 is put in the high-humidity environment when the main SW 195 of the camera 100 is OFF.

The present invention can also be realized by the process of supplying the program for achieving one or more functions of the above embodiments to a system or an apparatus via a network or a storage medium, and causing one or more processors in the system or the apparatus to read and execute the supplied program. Moreover, the present invention can also be realized by a circuit (e.g., ASIC (application specific integrated circuit)) for achieving the one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105533, filed May 25, 2015, which is hereby incorporated by reference herein in its entirety.

What is claimed is:

1. An imaging apparatus comprising:
   at least one processor that functions, according to at least one program stored in a memory, as units comprising:
   a detecting unit configured to detect an environment of a photographing optical system;
   a control unit configured to control an actuator of driving the photographing optical system to perform a first operation and a second operation, which is different from the first operation, of performing maintenance of the photographing optical system; and
   a measuring unit configured to measure an elapsed time froze a stop of the photographing optical system driven in the first operation,
   wherein the detecting unit is configured to detect a temperature and a humidity as the environment,
   wherein the control unit is configured to control the actuator to perform the second operation in a case where the elapsed time exceeds threshold,
   wherein, in a case where the humidity detected by the detecting unit is a first value, the control unit is configured to set the threshold to a smaller value than a case where the humidity detected by the detecting unit is second value lower than the first value, and
   wherein the control unit is configured to control the actuator to perform the second operation a in a case where the elapsed time does not exceed the threshold and a change amount of the temperature detected by the detecting unit exceeds a pre determined value.

2. The imaging apparatus according to claim 1, wherein the control unit is configured to drive the actuator in the second operation, according to the environment at a point when a power supply is turned on.

3. The imaging apparatus according to claim 1, wherein the first operation includes a focusing operation, a focal distance changing operation or a shake correcting operation.

4. The imaging apparatus according to claim 1, wherein the actuator includes a piezoelectric element.

5. The imaging apparatus according to claim 4, wherein, in the second operation, an AC (alternating current) voltage having a frequency different from a frequency of an AC voltage applied to the piezoelectric element in the first operation or an AC voltage having a phase different from a phase of the AC voltage applied to the piezoelectric element in the first operation is applied to the piezoelectric element.

6. A control method of an imaging apparatus, comprising:
   detecting an environment of a photographing optical system;
   controlling an actuator of driving the photographing optical system to perform a first operation and a second operation, which is different from the first operation, of performing maintenance of the photographing optical system; and
   measuring an elapsed time from a stop of the photographing optical system driven in the first operation,
   wherein a temperature and a humidity are detected as the environment, wherein the actuator is controlled to perform the second operation in a case where the elapsed time exceeds a threshold, wherein, is a case where the detected humidity is a first value, the threshold is set to a smaller value than a ease where the detected humidity is a second value lower than the first value, and wherein the actuator is controlled to perform the second operation in a case where the elapsed time does not exceed the threshold and a change amount of the detected temperature exceeds a predetermined value.

7. A non-transitory computer-readable storage medium which stores a program for causing a computer imaging apparatus to execute:

a step of detecting an environment of a photographing optical system;

a step of controlling an actuator of driving the photographing optical system to perform a first operation and a second operation, which is different from the first operation, of performing maintenance of the photographing optical system; and a step of measuring an elapsed time from a stop of the photographing optical system driven in the first operation, wherein, in the detecting step, a temperature and a humidity are detected as the environment, wherein, in the controlling step, the actuator is controlled to perform the second operation in a case where the elapsed time exceeds a threshold, wherein, in a case where the humidity detected in the detecting step is a first value, the threshold is set in the controlling step to a smaller value than a case where the humidity detected in the detecting step is a second value lower than the first value, and wherein the actuator is controlled in the controlling step to perform the second operation in a case where the elapsed time does not exceed the threshold and a change amount of temperature detected in the detecting step exceeds a predetermined value.

* * * * *